(12) United States Patent　　(10) Patent No.:　US 12,634,756 B2
Sha et al.　　(45) Date of Patent:　May 19, 2026

(54) NETWORK TRIGGERED AGGREGATION OPERATIONS

(71) Applicant: ZTE Corporation, Shenzhen (CN)

(72) Inventors: Xiubin Sha, Shenzhen (CN); Bo Dai, Shenzhen (CN); Ting Lu, Shenzhen (CN); Li Niu, Shenzhen (CN); Jie Tan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 362 days.

(21) Appl. No.: 18/434,551

(22) Filed: Feb. 6, 2024

(65) Prior Publication Data

US 2024/0214869 A1　　Jun. 27, 2024

Related U.S. Application Data

(63) Continuation of application No. PCT/CN2021/111952, filed on Aug. 11, 2021.

(51) Int. Cl.
*H04W 28/06*　　(2009.01)
*H04W 28/02*　　(2009.01)

(52) U.S. Cl.
CPC ..... *H04W 28/065* (2013.01); *H04W 28/0268* (2013.01)

(58) Field of Classification Search
CPC ........................ H04W 28/065; H04W 28/0268
See application file for complete search history.

(56) References Cited

U.S. PATENT DOCUMENTS

| 9,504,021 B1 | 11/2016 | Wurtenberger et al. |
| 2019/0342921 A1 | 11/2019 | Loehr et al. |
| 2020/0223219 A1 | 7/2020 | Praharaj et al. |
| 2020/0266955 A1 | 8/2020 | Agrawal et al. |

(Continued)

FOREIGN PATENT DOCUMENTS

| CN | 101471754 A | * | 7/2009 |
| CN | 103139911 A | | 6/2013 |

(Continued)

OTHER PUBLICATIONS

EPO, Extended European Search Report for European Application No. 21 953 097.9, mailed on Aug. 13, 2024, 7 pages.

(Continued)

*Primary Examiner* — Melvin C Marcelo
(74) *Attorney, Agent, or Firm* — Perkins Coie

(57)　　　　ABSTRACT

Techniques are described for a network device to trigger an aggregation operation. An example wireless communication method includes transmitting, by a network device to a second communication device, a first message that triggers the second communication device to perform an aggregation operation, wherein the second communication device is from a list of one or more communication devices received by the network device from a core network device for performing the aggregation operation or from a first communication device; receiving, from the second communication device, a second message comprising a second configuration information of the second communication device; and transmitting, to the first communication device and in response to the receiving the second message, a third message comprising second configuration information of the second communication device.

20 Claims, 29 Drawing Sheets

(56) References Cited

U.S. PATENT DOCUMENTS

| | | | | |
|---|---|---|---|---|
| 2020/0336892 A1 | 10/2020 | Khoshnevisan et al. | | |
| 2022/0210698 A1 | 6/2022 | Ly et al. | | |
| 2024/0179783 A1* | 5/2024 | Sha | | H04W 8/186 |
| 2024/0205747 A1* | 6/2024 | Esswie | | H04W 28/0858 |
| 2024/0215087 A1* | 6/2024 | Nuggehalli | | H04W 76/14 |
| 2025/0016052 A1* | 1/2025 | Chen | | H04L 41/084 |
| 2025/0212088 A1* | 6/2025 | Niu | | H04W 40/12 |

FOREIGN PATENT DOCUMENTS

| | | |
|---|---|---|
| CN | 104798431 A | 7/2015 |
| CN | 108617016 A | 10/2018 |
| CN | 108631824 A | 10/2018 |
| CN | 110999449 A | 4/2020 |
| WO | 2020223219 A1 | 11/2020 |
| WO | 2021154443 A1 | 8/2021 |
| WO | 2023015465 A1 | 2/2023 |
| WO | 2023015466 A1 | 2/2023 |

OTHER PUBLICATIONS

International Search Report for International Application No. PCT/CN2021/111952, Mail Date: May 7, 2022. 12 pages.

Ericsson, "Response beam aggregation for response-driven paging," 3GPP TSG-RAN WG2 NR AH#3 Vancouver, Canada, Jan. 22-26, 2018 , Tdoc R2-1800357.

International Search Report for International Application No. PCT/CN2021/111951, Mail Date: May 7, 2022. 9 pages.

Extended European Search Report from European Patent Application No. 21953096.1 dated Jul. 25, 2024 (12 pages).

Intel Corporation, "Control plan procedures for L2 U2N Relaying," 3rd Generation Partnership Project (3GPP), Mobile Competence Center, 650 Riute DES Lucioles, F-06921 Sophia-Antipolis Cedex, France, 3GPP TSG-RAN WG2 Meeting #114e E-meeting, May 1-27, 2021, R2-2104888, 2021, 9 pages.

LG Electronics et al. "Support of NR V2X over NG," 3GPP TSG-RAN WG3 Meeting #108-e Jun. 1-11, 2020, E-Meeting, R3-204438, 56 pages.

OPPO, "KI#3, Sol#7: Update to remove Ens," 3rd Generation Partnership Project (3GPP), Mobile Competence Center, 650 Riute DES Lucioles, F-06921 Sophia-Antipolis Cedex, France, SA WG2 Meeting #140E Aug. 19 to Sep. 1, 2020, Elbonia, S2-2005252, 2020, 8 pages.

OPPO, "Discussion on NR sidelink relay discovery," 3rd Generation Partnership Project (3GPP), Mobile Competence Center, 650 Riute DES Lucioles, F-06921 Sophia-Antipolis Cedex, France, 3GPP TSG-RAN WG2 #113 bis electronic Online, Apr. 12-Apr. 20, 2021, R2-2103006, 2021, 9 pages.

* cited by examiner

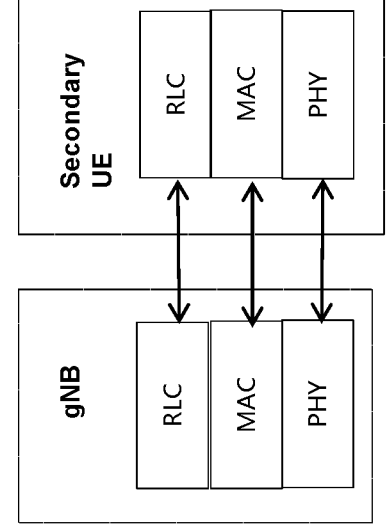
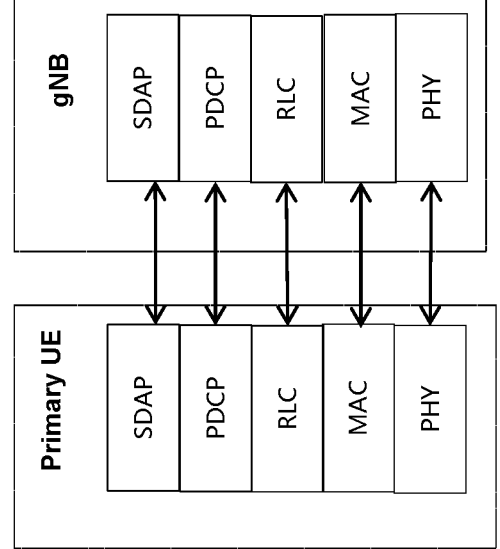
FIG. 2

1900

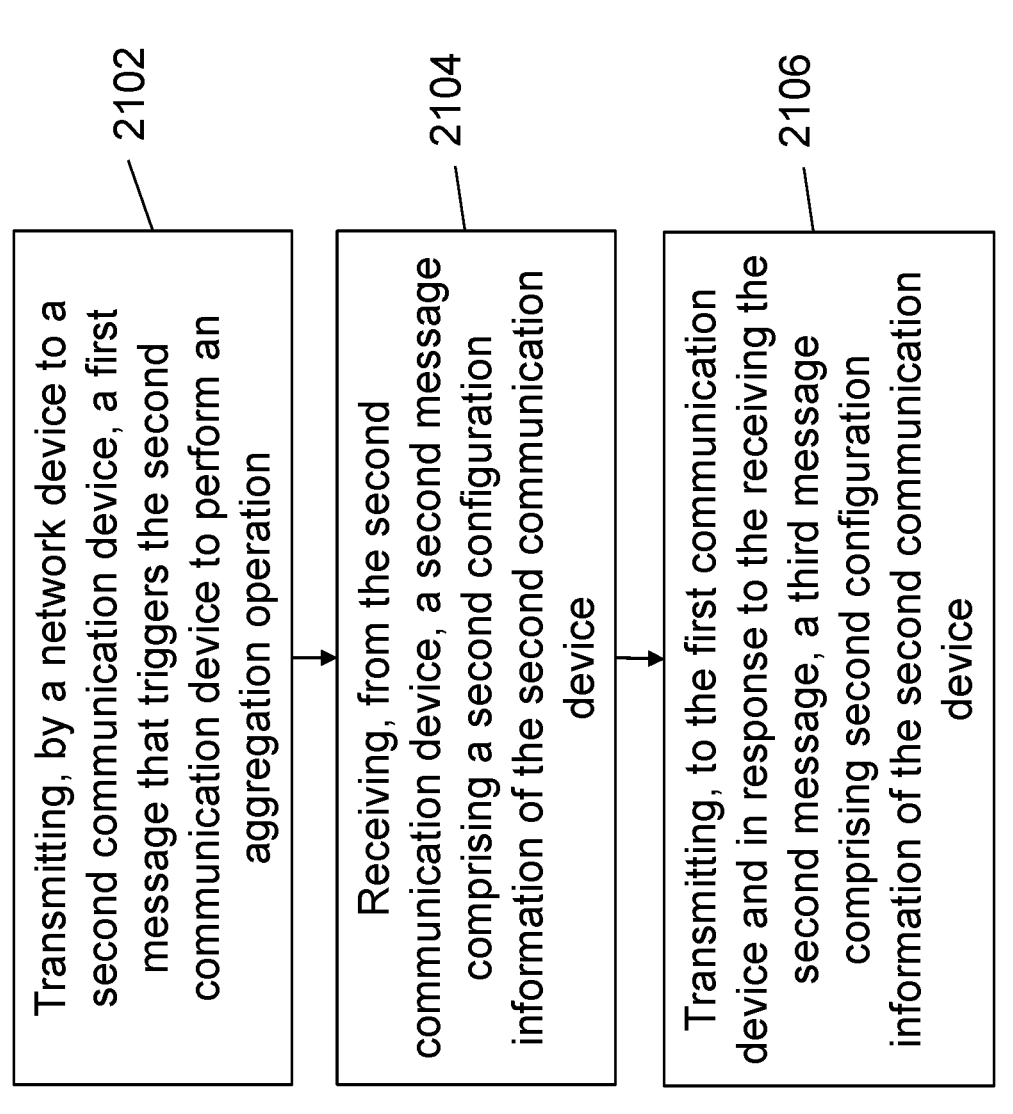

2102

Transmitting, by a network device to a second communication device, a first message that triggers the second communication device to perform an aggregation operation

2104

Receiving, from the second communication device, a second message comprising a second configuration information of the second communication device

2106

Transmitting, to the first communication device and in response to the receiving the second message, a third message comprising second configuration information of the second communication device

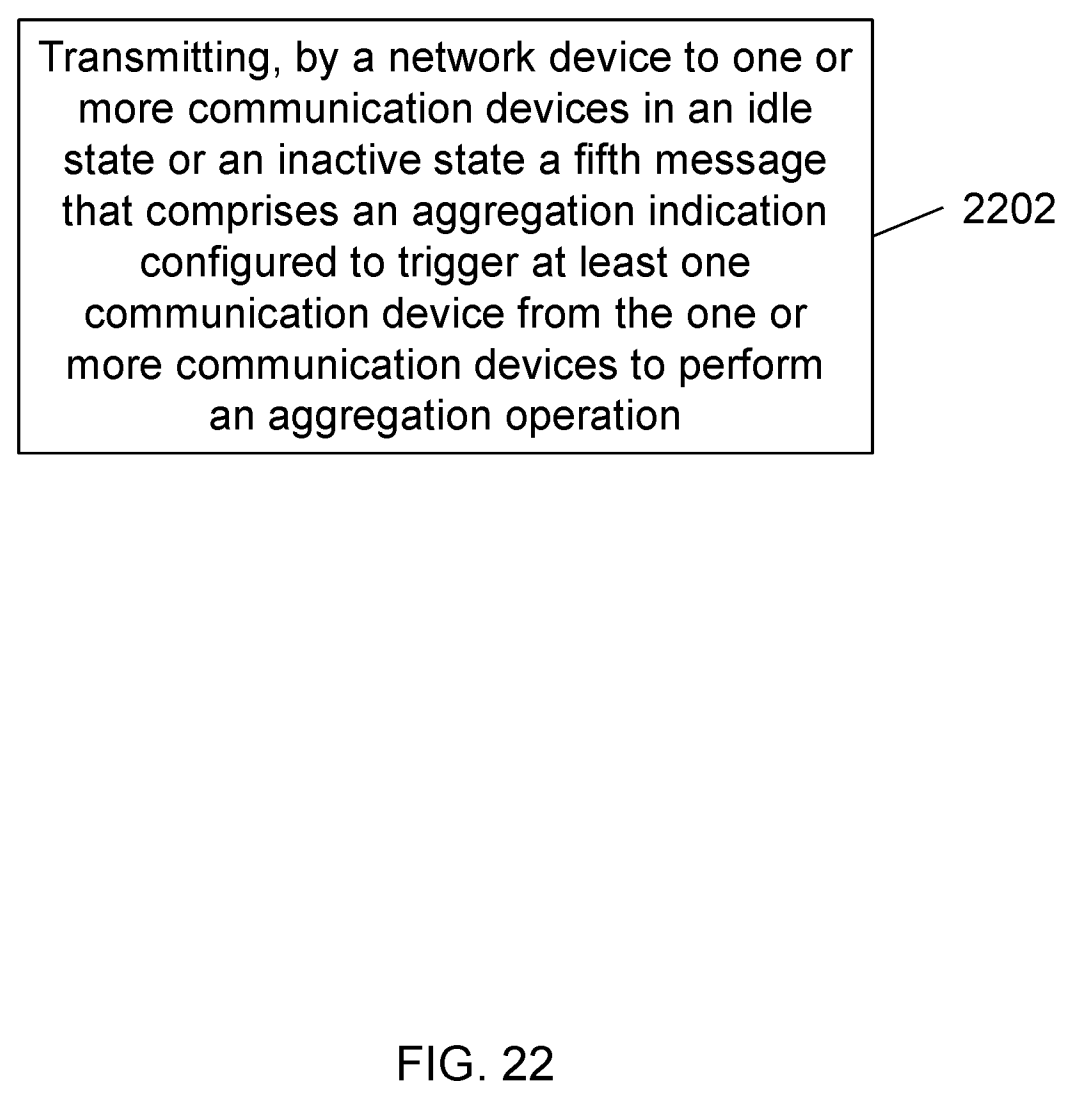

Transmitting, by a network device to one or more communication devices in an idle state or an inactive state a fifth message that comprises an aggregation indication configured to trigger at least one communication device from the one or more communication devices to perform an aggregation operation

FIG. 22

Receiving, by a second communication device from a network device, a first message to trigger an aggregation operation — 2302

Transmitting, by the second communication device and in response to the receiving the first message, a second message comprising a second identifier of the second communication device to the network device — 2304

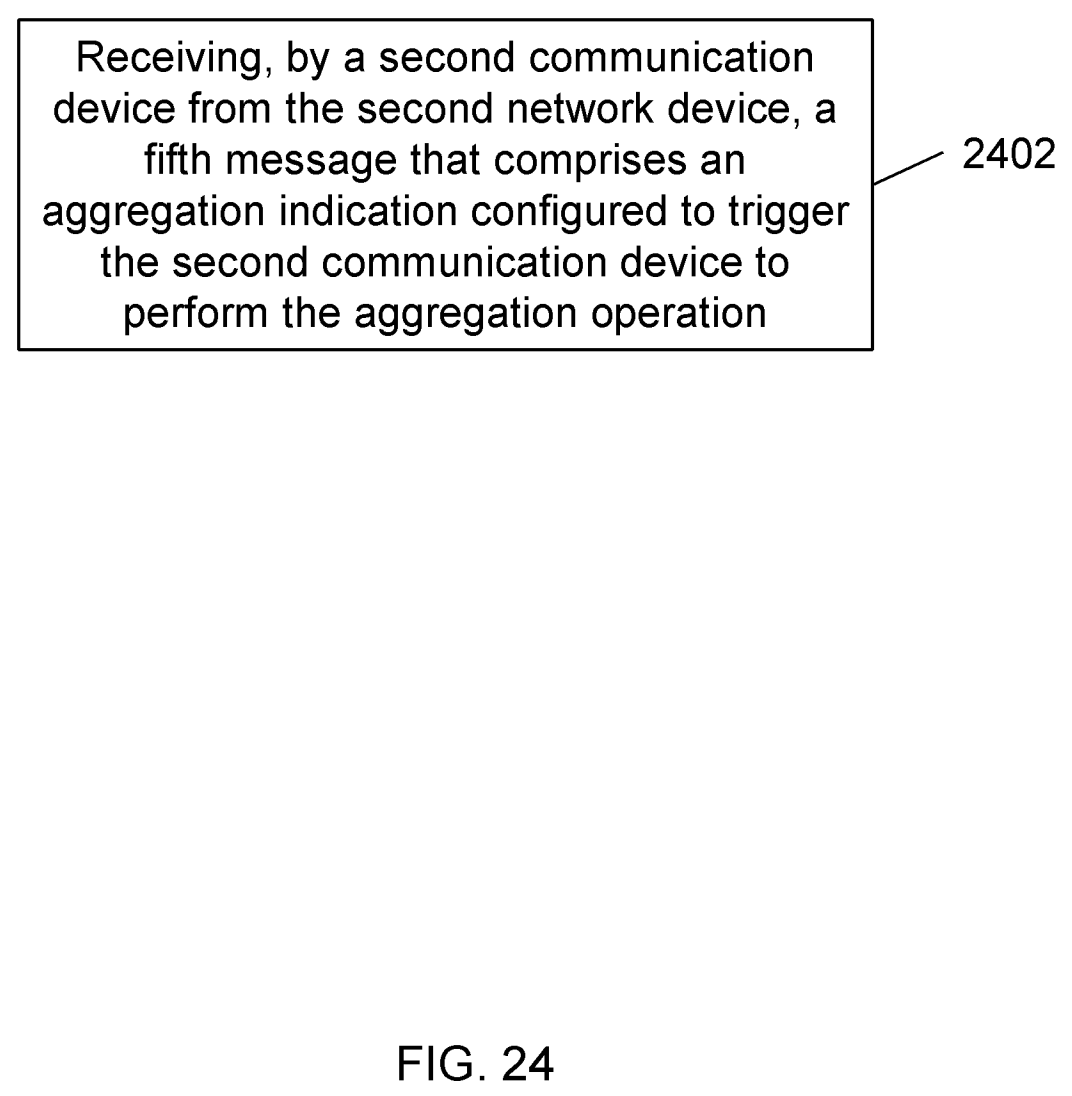

2402

Receiving, by a second communication device from the second network device, a fifth message that comprises an aggregation indication configured to trigger the second communication device to perform the aggregation operation

FIG. 24

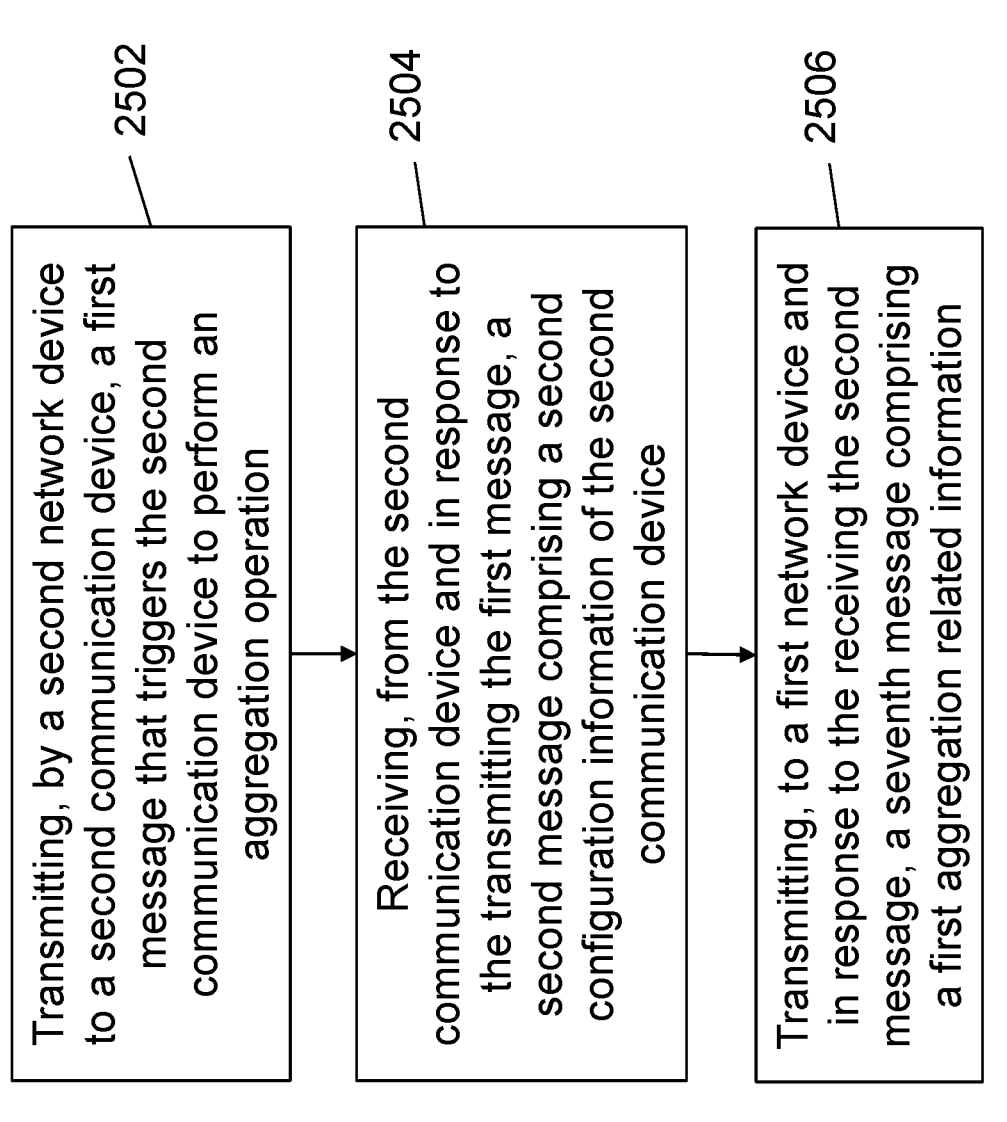

2502

Transmitting, by a second network device to a second communication device, a first message that triggers the second communication device to perform an aggregation operation

2504

Receiving, from the second communication device and in response to the transmitting the first message, a second message comprising a second configuration information of the second communication device

2506

Transmitting, to a first network device and in response to the receiving the second message, a seventh message comprising a first aggregation related information

FIG. 25

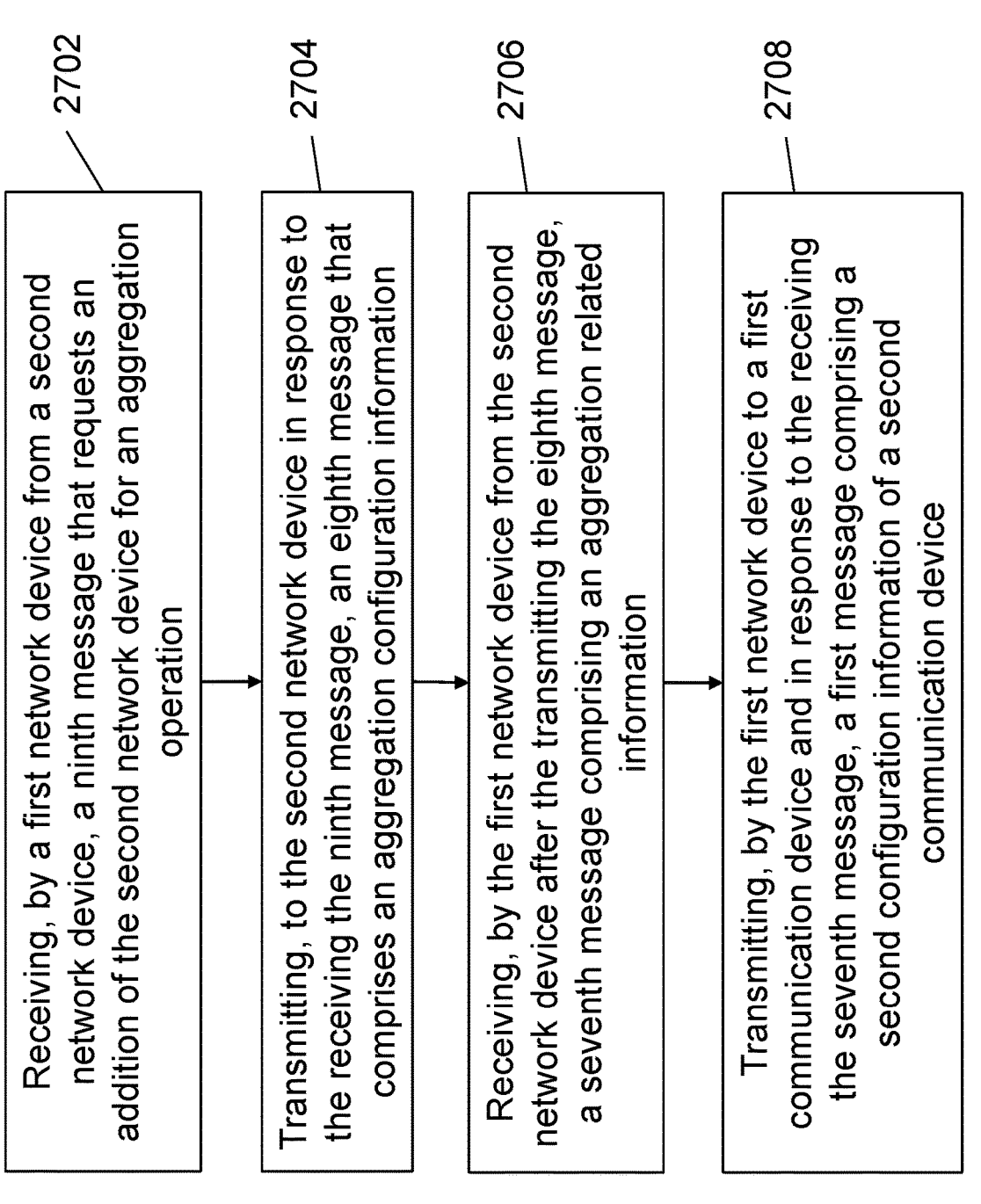

2702 Receiving, by a first network device from a second network device, a ninth message that requests an addition of the second network device for an aggregation operation 2704 Transmitting, to the second network device in response to the receiving the ninth message, an eighth message that comprises an aggregation configuration information 2706 Receiving, by the first network device from the second network device after the transmitting the eighth message, a seventh message comprising an aggregation related information 2708 Transmitting, by the first network device to a first communication device and in response to the receiving the seventh message, a first message comprising a second configuration information of a second communication device

FIG. 27

NETWORK TRIGGERED AGGREGATION OPERATIONS

CROSS REFERENCE TO RELATED APPLICATIONS

This patent document is a continuation of and claims benefit of priority to International Patent Application No. PCT/CN2021/111952, filed on Aug. 11, 2021. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

This patent document describes network triggered aggregation transmission techniques that may be performed by a communication device, such as a user equipment (UE).

A first wireless communication method includes transmitting, by a network device to a second communication device, a first message that triggers the second communication device to perform an aggregation operation, wherein the second communication device is from a list of one or more communication devices received by the network device from a core network device for performing the aggregation operation or from a first communication device; receiving, from the second communication device, a second message comprising a second configuration information of the second communication device; and transmitting, to the first communication device and in response to the receiving the second message, a third message comprising second configuration information of the second communication device.

In some embodiments, the second configuration information in the third message comprises any one or more of: one or more address related parameters of the second communication device, or an aggregated data volume information of the second communication device. In some embodiments, the third message further comprises a radio configuration information configured for the second communication device. In some embodiments, the first message comprises any one or more of: a first configuration information of the first communication device for the aggregation operation, a first configuration for a protocol data unit (PDU) session of a transmission or of a reception by the aggregation operation, or a second configuration for a quality of service (QoS) flow of the transmission or of the reception by the aggregation operation.

A second wireless communication method includes transmitting, by a network device to one or more communication devices in an idle state or an inactive state a fifth message that comprises an aggregation indication configured to trigger at least one communication device from the one or more communication devices to perform an aggregation operation.

In some embodiments, the network device receives a fourth message from a second communication device after transmitting to the one or more communication devices the fifth message, and the fourth message comprises an aggregation indication that indicates that the second communication device requests to perform the aggregation operation. In some embodiments, the network device transmits the fifth message in response to receiving a sixth message comprising an aggregation related information that includes any one or more of: an address of the first communication device, a first list of one or more identifiers of the one or more communication devices for performing the aggregation operation, a second list of communication device identifiers that belong to a same user, a third list of one or more identifiers of cells on which the second communication device camp, a fourth list of one or more identifiers of network devices on which the second communication device camp, a radio capability of the second communication device, or an identifier of the radio capability of the second communication device. In some embodiments, the network device receives the sixth message comprising the aggregation related information from a core network device. In some embodiments, the network device receives the aggregation related information from the first communication device or from the second communication device. In some embodiments, the core network device includes an access and mobility management function (AMF).

In some embodiments, the method further includes transmitting or receiving, by the network device, data with the first communication device using the aggregation operation. In some embodiments, the transmitting the data using the aggregation operation comprises: transmitting a first packet data convergence protocol (PDCP) protocol data unit (PDU) set corresponding to the data to the second communication device and transmitting a second PDCP PDU set corresponding to the data to the first communication device, or transmitting the data to the second communication device and the first communication device. In some embodiments, the receiving the data using the aggregation operation comprises: receiving a first packet data convergence protocol (PDCP) protocol data unit (PDU) set corresponding to the data from the second communication device and receiving a second PDCP PDU set corresponding to the data from the first communication device, or receiving the data from the second communication device and the first communication device.

A third wireless communication method includes receiving, by a second communication device from a network device, a first message to trigger an aggregation operation; and transmitting, by the second communication device and in response to the receiving the first message, a second message comprising a second identifier of the second communication device to the network device.

In some embodiments, the first message comprises a first configuration information of a first communication device and any one or more of: a first configuration for a protocol data unit (PDU) session of a transmission or of a reception by the aggregation operation, or a second configuration for a quality of service (QoS) flow of the transmission or of the reception by the aggregation operation. In some embodiments, the second communication device transmits, to an access and mobility management function (AMF), a registration request message comprising an aggregation capability indication that indicates that second communication device supports a performance of the aggregation operation.

A fourth wireless communication method includes receiving, by a second communication device from the second network device, a fifth message that comprises an aggregation indication configured to trigger the second communication device to perform the aggregation operation.

In some embodiments, the second communication device sends a fourth message to the second network device after receiving from the communication device the fifth message, and the fourth message comprises an aggregation indication that indicates that the second communication device requests to perform the aggregation operation.

A fifth wireless communication method includes transmitting, by a second network device to a second communication device, a first message that triggers the second communication device to perform an aggregation operation; receiving, from the second communication device and in response to the transmitting the first message, a second message comprising a second configuration information of the second communication device; and transmitting, to a first network device and in response to the receiving the second message, a seventh message comprising a first aggregation related information.

In some embodiments, the first message comprises any one or more of: a first identifier of the first communication device, a first configuration for a protocol data unit (PDU) session of a transmission or of a reception by the aggregation operation, or a second configuration for a quality of service (QoS) flow of the transmission or of the reception by the aggregation operation. In some embodiments, the first aggregation related information includes any one or more of: a first list of one or more identifiers of one or more communication devices for performing the aggregation operation, wherein the one or more communication devices includes the second communication device, a second list of communication device identifiers that belong to a same user, a radio capability of the second communication device, or an identifier of the radio capability of the second communication device. In some embodiments, the first message is transmitted in response to the second network device receiving an eighth message from the first network device, wherein the eighth message comprises an aggregation configuration information. In some embodiments, the aggregation configuration information in the eighth message includes any one or more of: one or more radio parameters of the second network device, a first configuration for a protocol data unit (PDU) session of a transmission or of a reception by the aggregation operation, a second configuration for a quality of service (QoS) flow of the transmission or of the reception by the aggregation operation, or a first configuration information of the first communication device for the aggregation operation. In some embodiments, the eighth message is received in response to the second communication device transmitting a ninth message to a first network device, wherein the ninth message requests an addition of the second network device for the aggregation operation.

A sixth wireless communication method includes receiving, by a second network device from a core network device, a first paging message comprising a second aggregation related information that includes: an aggregation indication that indicates that the aggregation operation is enabled, a radio capability of the second communication device, a first identifier of the first communication device, or an identifier of the first network device; transmitting, in response to the receiving the first paging message, a second paging message to the second communication device, wherein the second paging message includes the aggregation indication; and receiving, from the second communication device, a sixth message that indicates that the second communication device request to perform the aggregation operation, wherein the sixth message comprises the aggregation indication. In some embodiments, the core network device includes an access and mobility management function (AMF).

A seventh wireless communication method includes receiving, by a first network device from a second network device, a ninth message that requests an addition of the second network device for an aggregation operation; transmitting, to the second network device in response to the receiving the ninth message, an eighth message that comprises an aggregation configuration information; receiving, by the first network device from the second network device after the transmitting the eighth message, a seventh message comprising an aggregation related information; and transmitting, by the first network device to a first communication device and in response to the receiving the seventh message, a first message comprising a second configuration information of a second communication device.

In some embodiments, the aggregation related information includes any one or more of: a first list of one or more identifiers of one or more communication devices for performing the aggregation operation, wherein the one or more communication devices includes the second communication device, a second list of communication device identifiers that belong to a same user, a radio capability of the second communication device, or an identifier of the radio capability of the second communication device. In some embodiments, the aggregation configuration information in the eighth message includes any one or more of: one or more radio parameters of the second network device, a first configuration for a protocol data unit (PDU) session of a transmission or of a reception by the aggregation operation, a second configuration for a quality of service (QoS) flow of the transmission or of the reception by the aggregation operation, or a first configuration information of the first communication device for the aggregation operation.

In some embodiments, the second configuration information comprises any one or more of: a radio configuration information configured for the second communication device, or one or more address related parameters of the second communication device. In some embodiments, prior to the receiving the ninth message, the method further comprises: receiving a tenth message from a core network device, wherein the tenth message includes the aggregation related information. In some embodiments, the core network device includes an access and mobility management function (AMF).

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 2 shows the protocol stack for the user plane for UE aggregation.

FIGS. 21-27 show exemplary flowcharts for facilitating an aggregation operation.

DETAILED DESCRIPTION

In the radio communication, various type of service (e.g. augmented reality (AR), virtual reality (VR), video with large number of pixels, etc.,) may have high data rate and/or need large transmission bandwidth (e.g., eMBB service), which may be impossible or difficult to be provided by a single user equipment (UE), especially by a low capability UE (e.g. a sensor UE). Furthermore, the UE may find it impossible or difficult to provide a sufficiently high data rate at a cell edge because the UE transmission power may be limited at the cell edge. If multiple UEs can be aggregated to transmit and/or receive, the high data rate and/or large transmission bandwidth can be obtained. This patent application describes techniques to aggregate multiple UEs to perform transmission and/or reception initiated by network.

The following table provides a list of acronyms that may be used in this patent document and their corresponding full names:

| Acronym | Full Name |
| --- | --- |
| AUSF | Authentication Server Function |
| HSS | Home Subscriber Server |
| UDM | Unified Data Management |
| UPF | User Plane Function |
| SMF | Session Management Function |
| AMF | Access and Mobility Management Function |
| NAS | Non-Access-Stratum |
| RRC | Radio Resource Control |
| PDCP | Packet Data Convergence Protocol |
| RLC | Radio Link Control |
| MAC | Medium Access Control |
| PHY | Physical layer |
| UE | User Equipment |
| UP | User Plane |
| CN | Core Network |
| UE AP ID | UE Application Protocol ID |
| DN | Data Network |

In the following example embodiments for UE aggregation, the following assumptions can be made: one UE is used as the primary UE or anchor UE, which can connect to the application layer or DN; one or more other UEs are used as the secondary UEs or non-anchor UEs, which can only assist the primary UE or anchor UE to transmit and/or receive user data. The terms "primary UE" and "secondary UE" are used separately for these UEs in this patent document. The terms "primary UE" and "secondary UE" can be respectively substituted by "anchor UE" and "non-anchor UE" separately without changing the implementation. The embodiments described in this patent document describe a user plain protocol architecture for UE aggregation.

Figure 1:
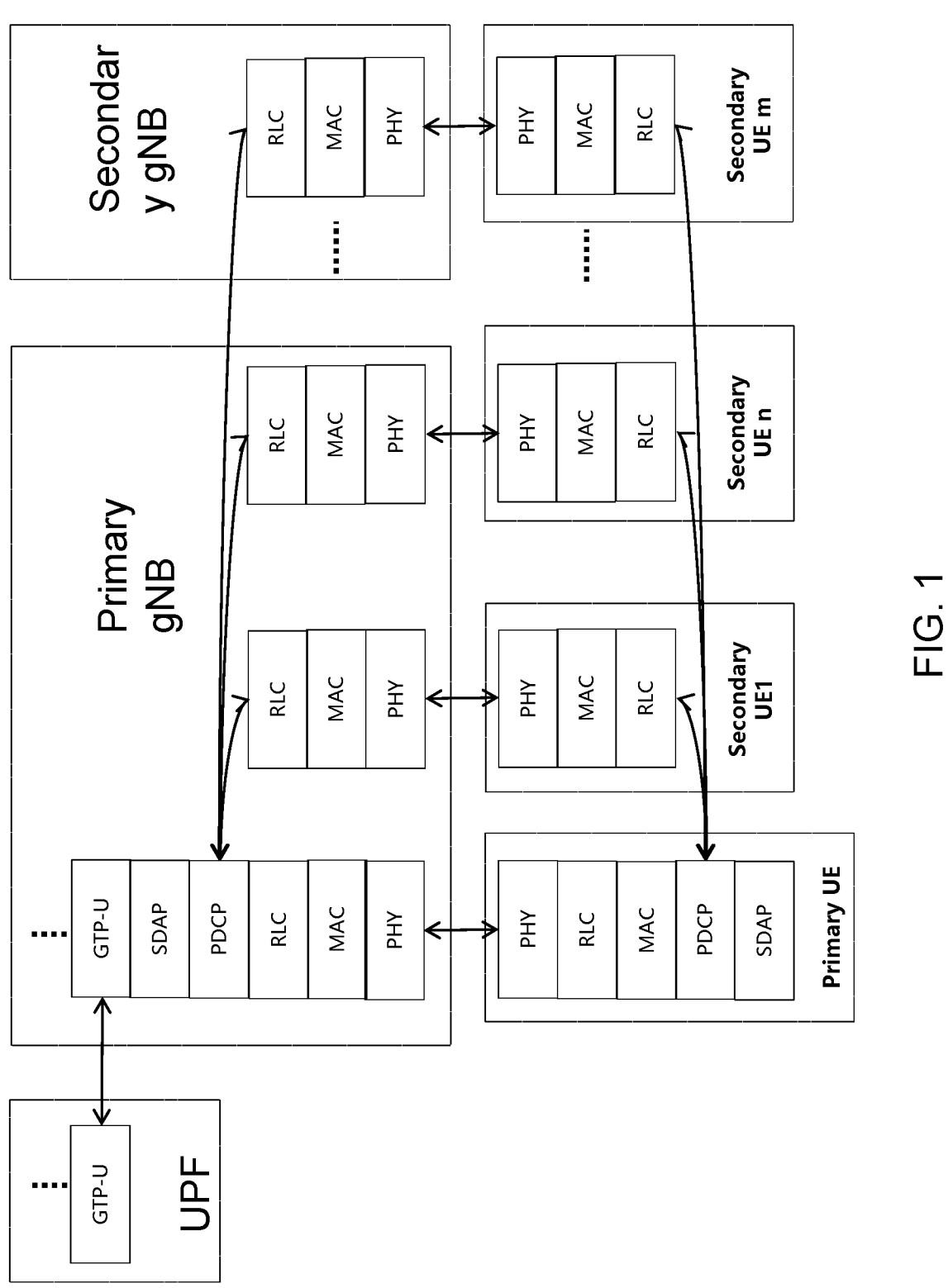
FIG. 1 shows the user plane data flow direction for UE aggregation.

FIG. 1 shows the user plane data flow direction for UE aggregation. In FIG. 1, only primary UE has the full protocol entity (e.g. has PHY, MAC, RLC, PDCP and SDAP entity, and the related GTP-U tunnel). In FIG. 1, the secondary UEs have only the PHY, MAC and RLC entity. The RLC of the secondary UE transmits user data (PDCP PDU) to the PDCP of primary UE and/or receives user data (PDCP PDU) from the PDCP of the primary UE. The gNB in FIG. 1 have a sublayer or an entity that play the same role as that in UE.

FIG. 2 shows the protocol stack for the user plane for UE aggregation. In FIG. 2, only primary UE has the full protocol entity (e.g., including SDAP, PDCP, RLC, MAC and PHY sublayer (or entity). In FIG. 2, the secondary UEs have only the RLC, MAC and PHY entity.

Figure 3:
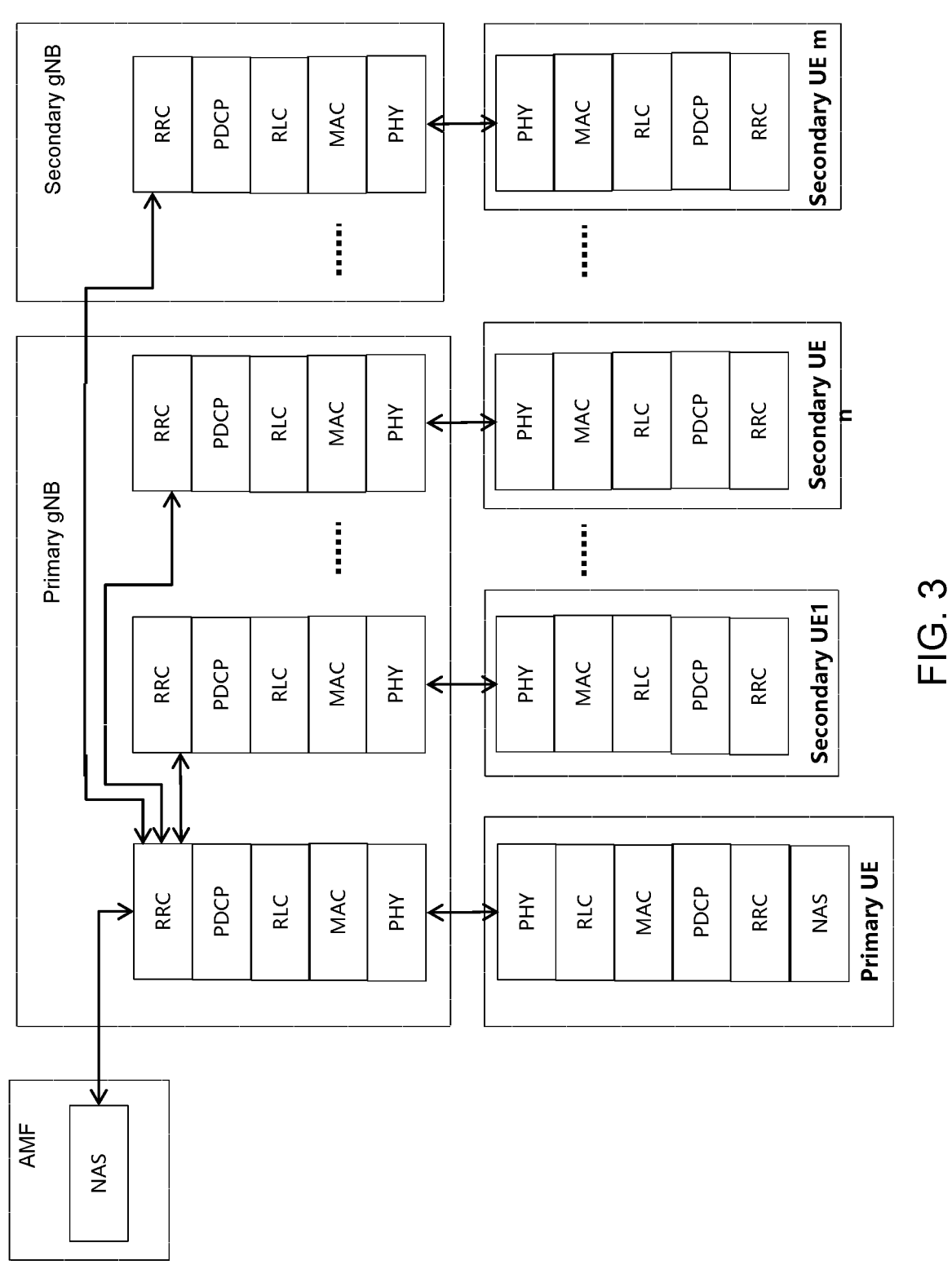
FIG. 3 shows the signaling flow for the control plane for UE aggregation.

FIG. 3 shows the signaling flow for the control plane for UE aggregation. In FIG. 3, every UE has full AS entity (e.g. RRC entity, PDCP, RLC, MAC, PHY). The RRC configuration for secondary UE is coordinated with the RRC configuration for the primary UE in the gNB. The RRC configuration includes at least one of the following: the RLC-BearerConfig, DRB configuration. E.g. the DRB-Identity, eps-BearerIdentity and sdap-Config should be consistent; and the LogicalChannelIdentity should not be conflicted.

In FIG. 3, only the primary UE has the NAS entity, which exchanges the NAS signaling with the NAS entity of AMF. To avoid DRB-Identity conflicting and/or LogicalChannelIdentity conflicting in the case that UE has at least two services where one is the aggregation service that concurrent with another service only carried in the secondary UE, a UE aggregation indication can be included in the RRC configuration, e.g. in the RLC-BearerConfig and/or DRB configuration, to differentiate the LogicalChannelIdentity from the DRB-Identity allocated for the aggregation service or for the non aggregation service by the primary UE of UE aggregation or by the secondary UE itself. The identity of non-aggregation service is allocated by the secondary gNB wherein the secondary UE camps. If the secondary UE carries an aggregated service and a non-aggregated service, the identities of the two services should be differentiated.

Figure 4:
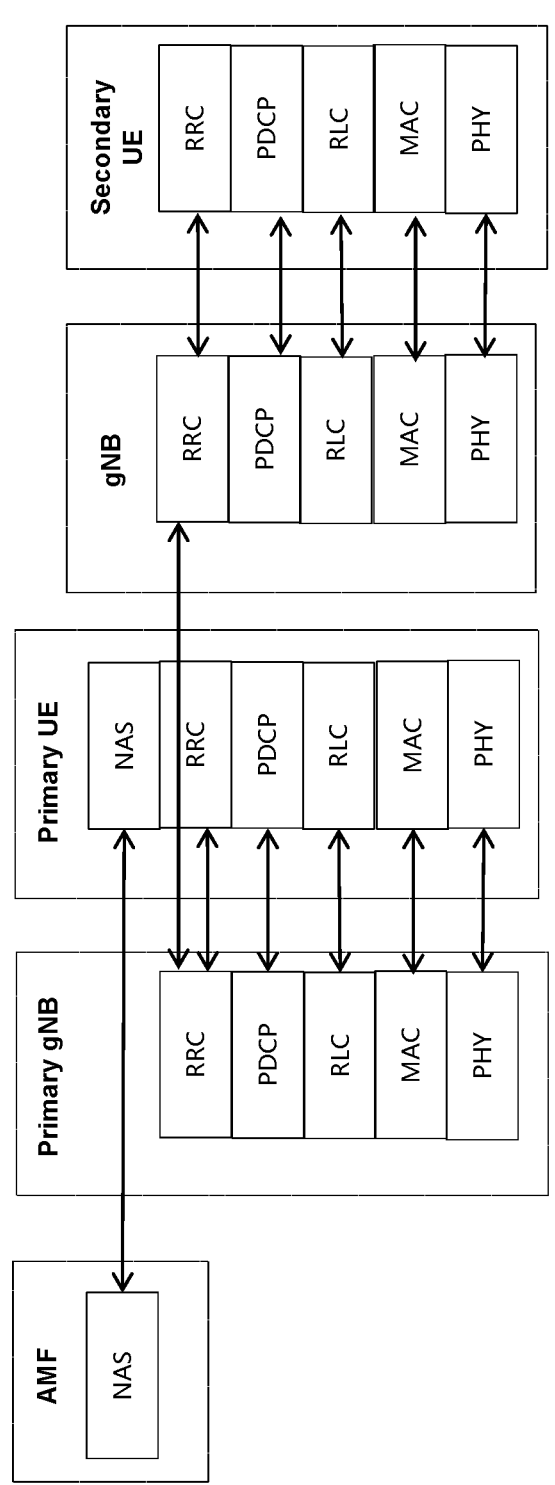
FIG. 4 shows the protocol stack for the control plane for UE aggregation.

FIG. 4 shows the protocol stack for the control plane for UE aggregation. In FIG. 4, all the UEs have full AS entity (e.g., RRC entity, PDCP, RLC, MAC, PHY). In FIG. 4, only the primary UE has the NAS entity, which exchanges the NAS signaling with the NAS entity of AMF.

The RRC entity in gNB corresponding the primary UE can exchange with the RRC entity in gNB corresponding to the secondary UE to coordinate the RRC configuration.

In FIGS. 5 to 18, the operations may be described next, above, or below the arrows that can indicate the information that is communicated and/or operation(s) that is/are performed.

Figure 5:
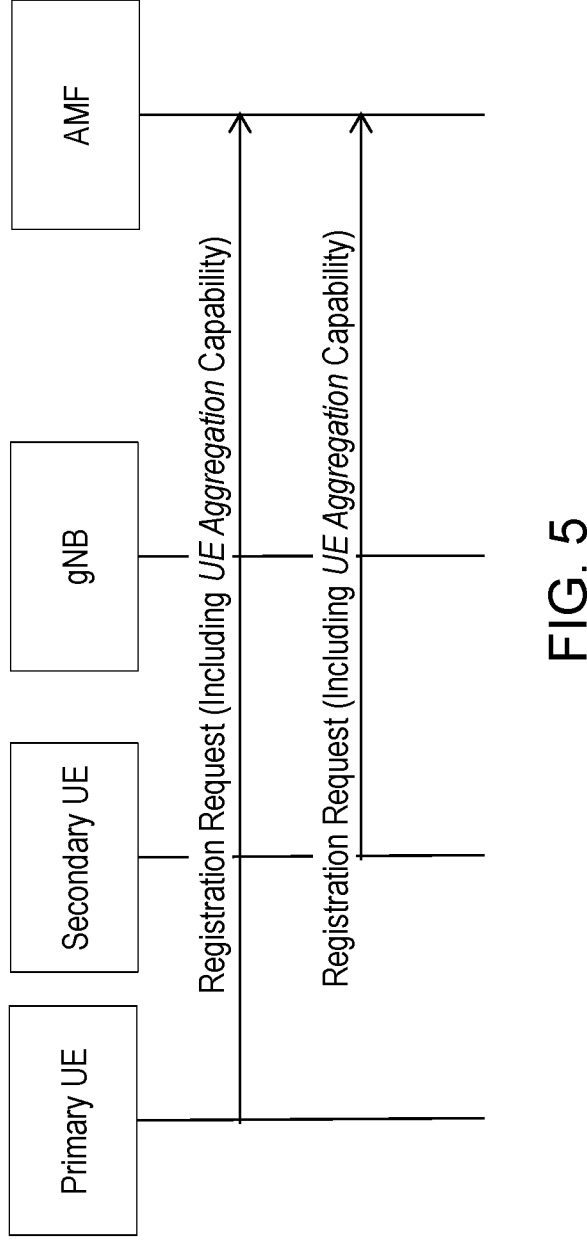
FIG. 5 shows the UE aggregation capability reporting procedure.

FIG. 5 shows the UE aggregation capability reporting procedure. Each UE reports its UE aggregation capability by NAS signaling (e.g. Registration request, Attach Request, Tracking Area Update Request and/or Routing Area Update Request) to CN (e.g., AMF or EPC), or the UE reports its UE aggregation capability by AS signaling (e.g. RRC Msg) to NodeB (e.g., eNB or gNB), and NodeB forwards the UE aggregation capability to CN (e.g., AMF or EPC). The UE aggregation capability transmitted by the UE indicates that the primary UE can perform transmission and/or reception by UE aggregation(e.g. multiple UEs work together to perform data transmission and/or reception).

Figure 6:
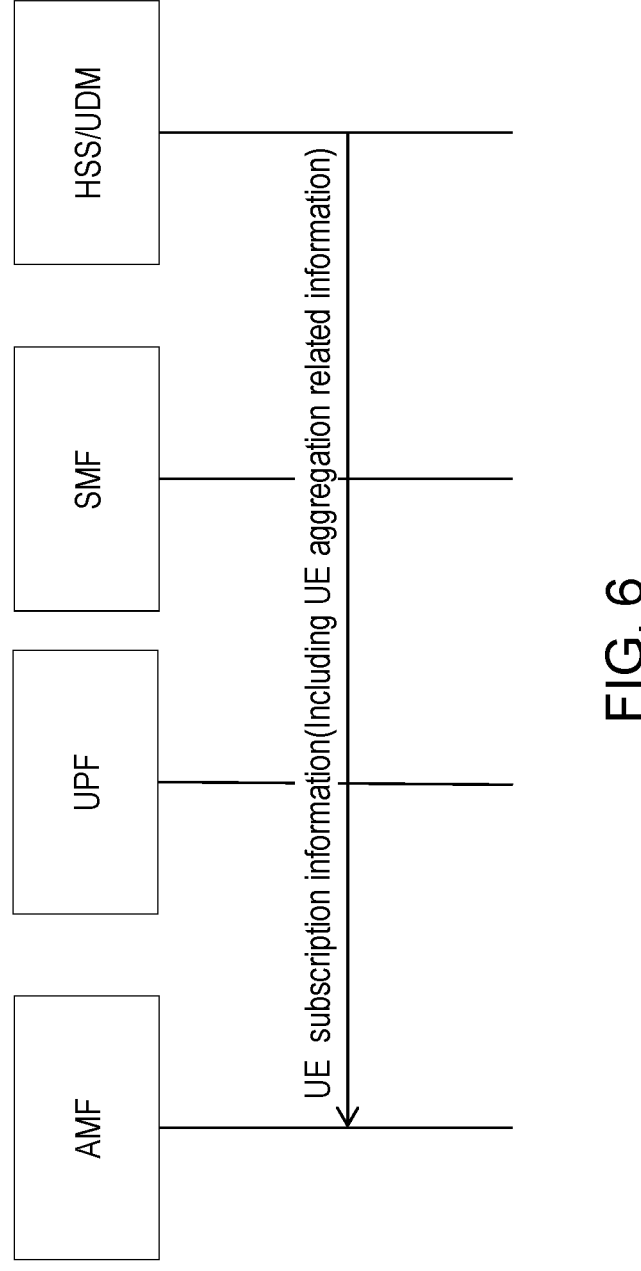
FIG. 6 shows the UE aggregation related subscription information delivery procedure by or from HSS/UDM.

FIG. 6 shows the UE aggregation related subscription information delivery procedure from HSS/UDM. HSS and/or UDM delivers the UE aggregation related subscription information to AMF. Wherein the UE aggregation related subscription information includes at least one of the following: the list of UE IDs that can be aggregated to perform data transmission and/or reception, the list of UE IDs that belong to a same user, the UE ID's index in the list, which can be used for efficiently identifying the UE. In some embodiments, the operations(s) shown in FIG. 6 can be performed before the operation(s) performed in FIG. 5. In some embodiments, the operations(s) shown in FIG. 6 can be performed after the operation(s) performed in FIG. 5.

Figure 7A:
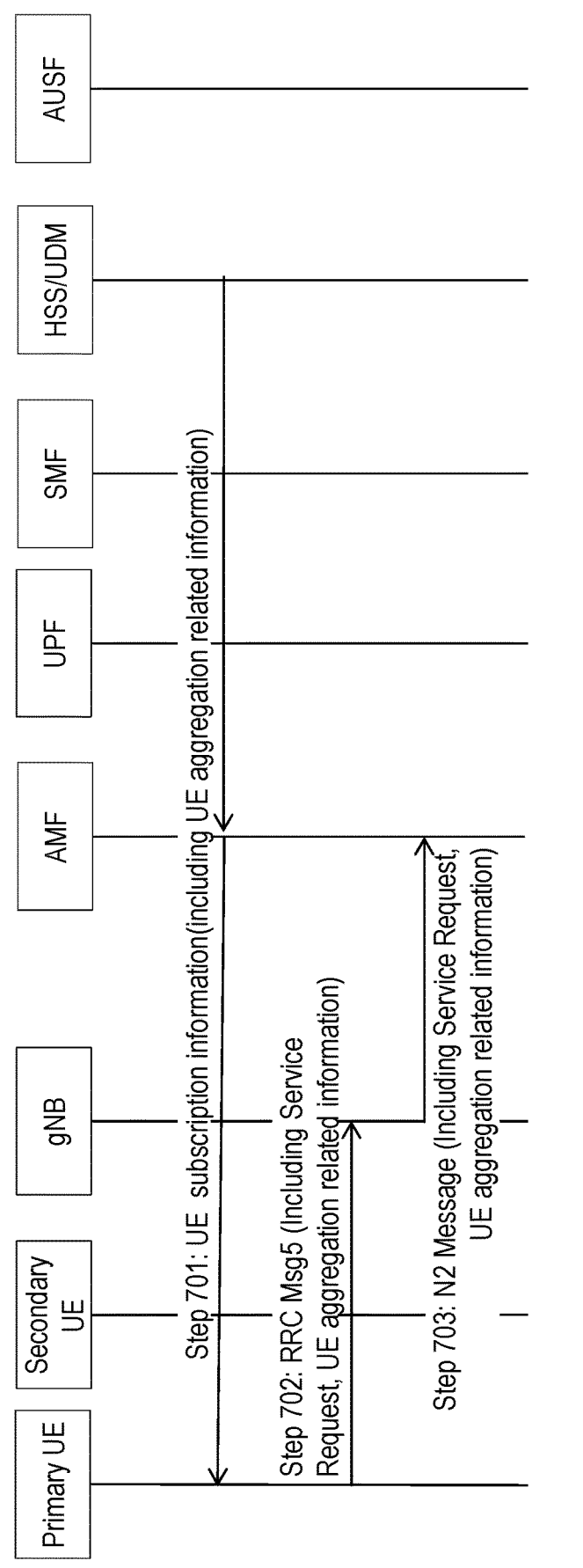
FIG. 7A shows the UE aggregation related subscription information delivery procedure from UE.

FIG. 7A shows the UE aggregation related subscription information delivery procedure from UE. HSS and/or UDM delivers the UE aggregation related subscription information to UE at Step 701. Wherein the UE aggregation related subscription information includes at least one of the following: the primary UE's address, the list of UE IDs that can be aggregated to perform data transmission and/or reception, the list of UE IDs that belong to a same user, the UE ID's index in the list, which can be used for efficiently identifying the UE.

UE delivers the UE aggregation related subscription information to gNB (e.g. in RRC Msg5) at Step 702, and gNB may further delivers the received UE aggregation related subscription information to AMF in N2 message at Step 703.

Figure 7B:
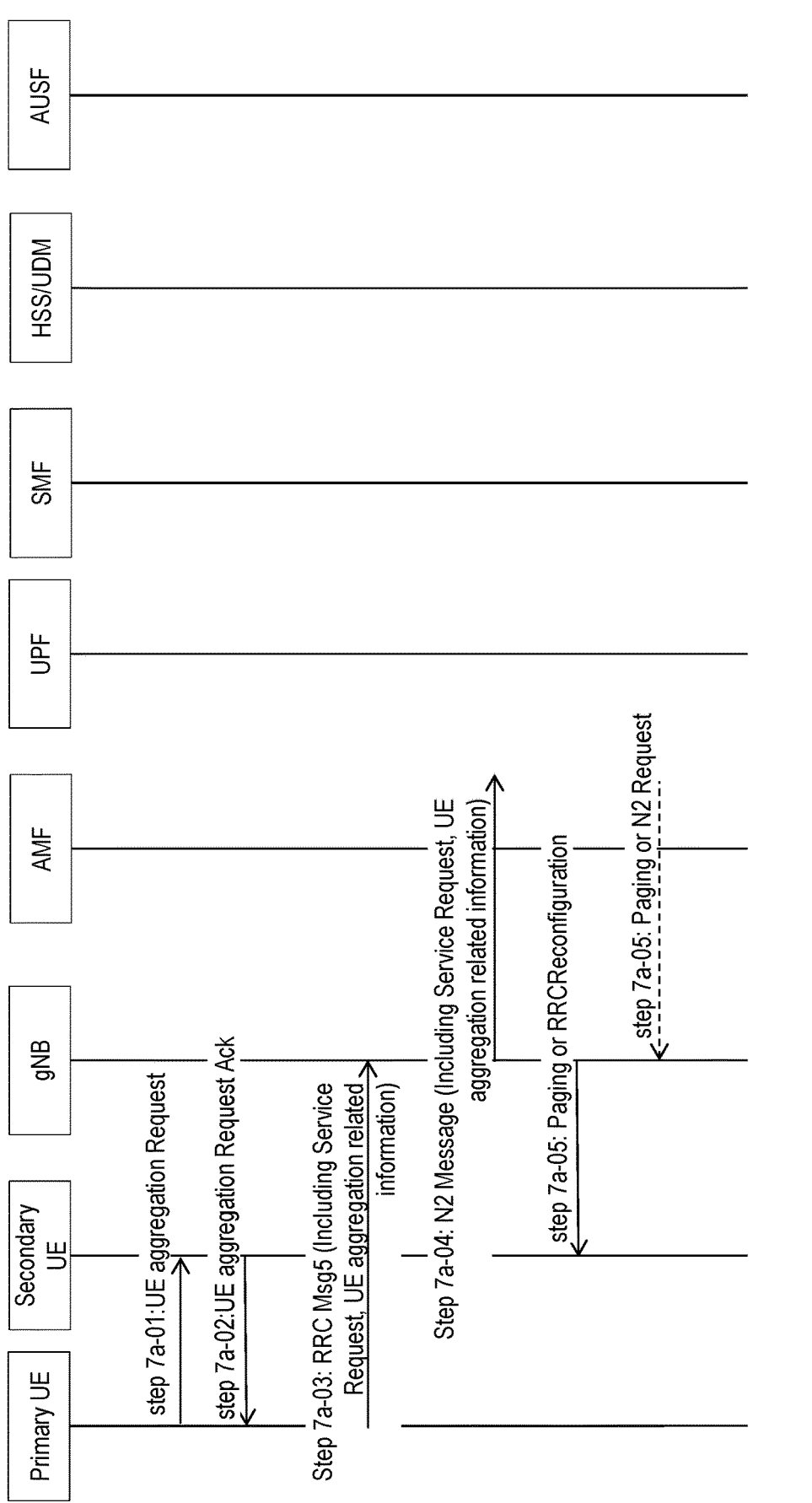
FIG. 7B shows the UE aggregation related negotiation information delivery procedure from UE.

FIG. 7B shows the UE aggregation related negotiation information delivery procedure from UE. Primary UE sends UE aggregation Request to the secondary UE, and the secondary UE sends UE aggregation Request acknowledge to the primary UE including UE aggregation related negotiation information. Wherein the UE aggregation related negotiation information includes at least one of: the secondary UE ID, the primary UE's address, the identity of cell that the secondary UE camps, the identity of gNB that the secondary UE camps. Wherein the request and request acknowledge can be send via sidelink with announce mechanism, or with Wi-Fi, Bluetooth, wireline etc.

UE delivers the UE aggregation related negotiation information to gNB (e.g. in RRC Msg5) at Step 7a-03, and gNB may further delivers the received UE aggregation related negotiation information to AMF in N2 message at Step 7a-03. Wherein:

if the secondary UE and the primary UE camps in the same gNB, and the secondary UE is in RRC_IDLE or RRC_INACTIVE state, gNB can send paging to the secondary UE to trigger RRC connection establishment.

if the secondary UE and the primary UE camps in the same gNB, and the secondary UE is in RRC_CONNECTED state, gNB configures the UE aggregation related radio parameters by RRCReconfiguration to the secondary UE with the radio configuration for the PDU session and/or QoS flow to be transmitted and/or received by UE aggregation, e.g., based on the primary UE's radio parameters. The gNB also configure the primary UE's address related parameters by RRCReconfiguration to UE for DL data forwarding. Wherein the primary UE's address includes at least one of the: the primary UE's ID, the primary UE's AP ID, the Tunnel Endpoint Identifier (TEID) for DL data forwarding between aggregated UEs, the IP address of the primary UE, the PC5 tunnel address, the UP Transport Layer Information used for DL data forwarding, Layer-2 ID, sl-DestinationIdentity etc.

if the secondary UE and the primary UE camps in different gNB, and the secondary UE is in RRC_IDLE or RRC_INACTIVE state, gNB delivers the received UE aggregation related negotiation information to AMF and AMF send paging to the secondary UE to trigger RRC connection establishment.

if the secondary UE and the primary UE camps in different gNB, and the secondary UE is in RRC_CONNECTED state, gNB delivers the received UE aggregation related negotiation information to AMF and AMF send N2 request message to trigger gNB to configure the UE aggregation related radio parameters by RRCReconfiguration to the secondary UE.

Figure 8:
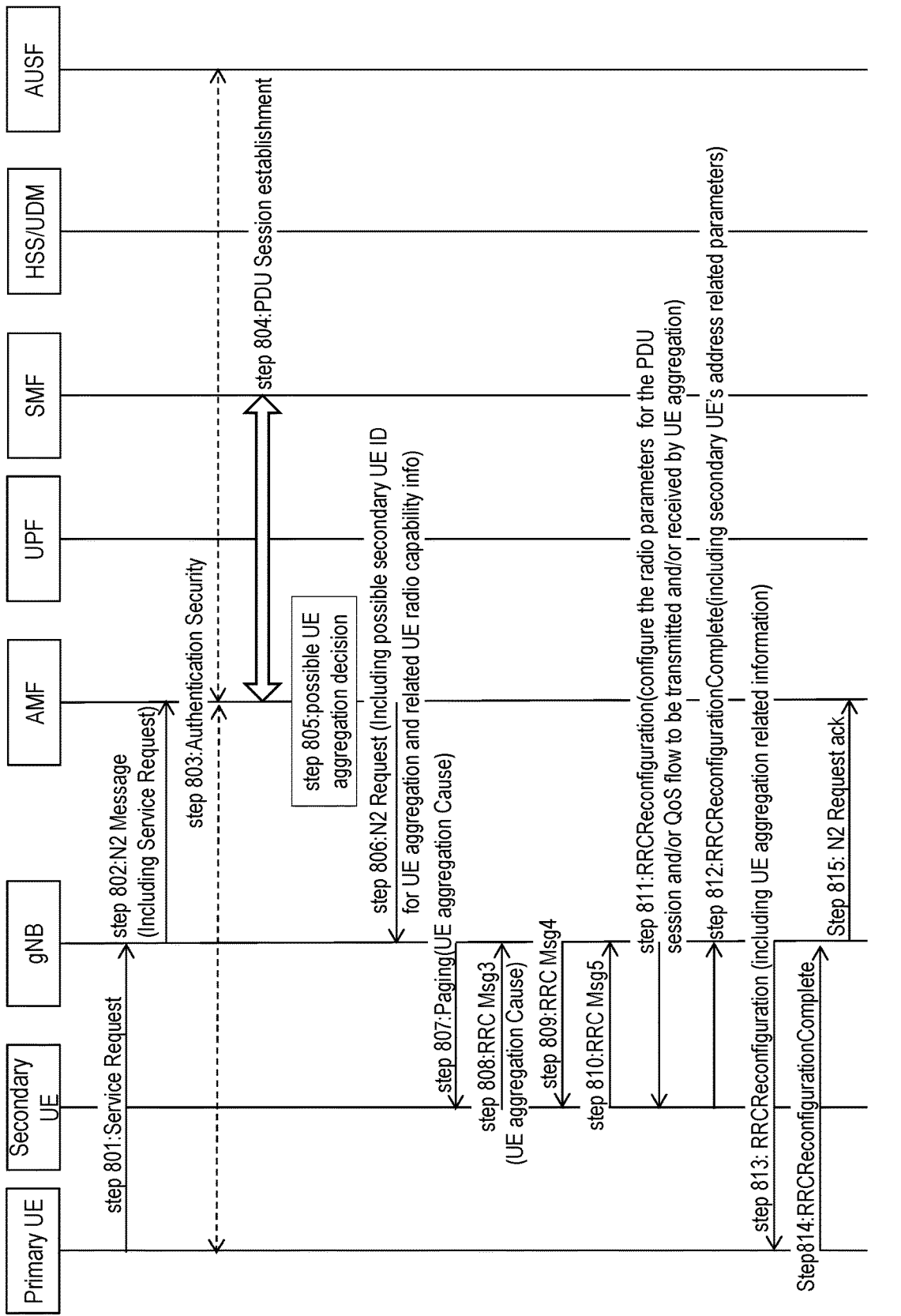
FIG. 8 shows the UE aggregation procedure triggered by Network.

FIG. 8 shows the UE aggregation procedure triggered by Network. In FIG. 8, at Step 801 and 802, the primary UE sends service request to AMF. After UE authentication/security verification (Step 803) and protocol data unit (PDU) session establishment between AMF, UPF and SMF (Step 804), the following UE aggregation procedure are performed:

Step 805: The AMF decides whether UE aggregation may be possible and/or necessary based on at least one of the following information: the UE aggregation capability information (e.g. obtained via FIG. 5), UE aggregation related subscription information (e.g. obtained via FIG. 6 or 7A)

and the PDU session information (e.g. the high data rate is required and/or the high transmission reliability should be provided, etc., which can be obtained via Step 804).

If the AMF decides that the UE aggregation is not feasible (e.g., the AMF determines that the UE has no UE aggregation capability) or not necessary (e.g., the AMF determines that the UE aggregation is not necessary for the PDU session), then UE aggregation related information is not included in the N2 Request message (Step 806), and the following step 807 to step 810 can be skipped. However, if the AMF decides that the UE aggregation is feasible (e.g., the AMF determines that the UE has UE aggregation capability) and is necessary (e.g., the AMF determines that the UE aggregation is necessary for the PDU session), then the UE aggregation related information is included in the N2 Request message, as shown in Step 806. Wherein, the UE aggregation related information includes at least one of the following: the list of possible secondary UE IDs for UE aggregation, the list of UE IDs that belong to a same user, the UE radio capability of the possible secondary UEs, the UE radio capability ID of the possible secondary UE.

Step 806: The AMF sends N2 request message including the UE aggregation related information to gNB. Wherein the N2 request message comprises at least one of the following: INITIAL CONTEXT SETUP REQUEST, UE CONTEXT MODIFICATION REQUEST, PDU SESSION RESOURCE SETUP REQUEST, PDU SESSION RESOURCE MODIFY REQUEST. And in some cases, the UE CONTEXT RESUME RESPONSE can also contain the UE aggregation related information to gNB and in this case the step 812 is not necessary.

The UE aggregation related information includes at least one of the following: the list of possible secondary UE IDs for UE aggregation, the list of UE IDs that belong to a same user, the UE radio capability of the possible secondary UE, the UE radio capability ID of the possible secondary UE.

Step 807: Upon receiving the UE aggregation related information from AMF (Step 806) or from UE (Step 702, or Step 7a-03), and decides to perform the UE aggregation, the gNB triggers the paging for the UEs in the list of possible secondary UE IDs for UE aggregation (e.g., possible secondary UEs for UE aggregation) with the UE aggregation cause or UE aggregation indication.

Step 808: Upon receiving the paging with the UE aggregation cause or aggregation indication, and UE decides to perform the UE aggregation procedure, the UE sends RRC Msg3(RRCResumeRequest, RRCSetupRequest, or new RRC message) with the UE aggregation cause or UE aggregation indication. The aggregation cause or aggregation indication indicates to the gNB that the RRC connection procedure is triggered by UE aggregation procedure, that the RRC connection procedure is used for UE aggregation procedure, or that the UE (e.g., secondary UE in FIG. 8) is configured to or is capable of performing the UE aggregation operation. In this step, the UE can decide not to perform the UE aggregation procedure based on the radio condition, UE power condition and/or established service condition, e.g. UE does not send RRC Msg3 upon receiving the paging message, and the UE aggregation procedure ends.

Step 809: Upon receiving RRC Msg3 with the UE aggregation cause or indication, the gNB sends RRC Msg4 (e.g., RRCResume, RRCSetup or new RRC message) to UE. In some cases, The RRC Msg4 includes the radio configuration for the PDU session and/or QoS flow to be transmitted by UE aggregation, e.g. based on the primary UE's radio parameters.

Step 810: UE sends RRC Msg5 to gNB.

Step 811: Upon receiving RRC Msg5, the gNB configures the radio parameters by RRCReconfiguration to UE with the radio configuration for the PDU session and/or QoS flow to be transmitted and/or received by UE aggregation, e.g., based on the primary UE's radio parameters. The gNB also configure the primary UE's address related parameters by RRCReconfiguration to UE for DL data forwarding. If these parameters are included in RRC Msg4, the Step 811 and Step 812 can be skipped.

Wherein the primary UE's address includes at least one of the: the primary UE's ID, the primary UE's AP ID, the Tunnel Endpoint Identifier (TEID) for DL data forwarding between aggregated UEs, the IP address of the primary UE, the PC5 tunnel address, the UP Transport Layer Information used for DL data forwarding, Layer-2 ID, sl-Destination-Identity etc.

Step 812: Upon receiving RRCReconfiguration, the UE includes it's address related parameters and/or the aggregated maximal data volume information (e.g., maximum amount of aggregated data) that can be provided in the RRCReconfigurationComplete. Wherein the UE's address includes at least one of the: UE ID, the UE AP ID, the Tunnel Endpoint Identifier (TEID) for UL data forwarding between aggregated UEs, the IP address of the secondary UE, the PC5 tunnel address, the UP Transport Layer Information used for UL data forwarding, Layer-2 ID, sl-Destination-Identity etc. This information can also be included in RRC Msg5.

The control plain signaling of the secondary UE ends till now (e.g., there is no N2 message for the secondary UEs to bear the PDU session/QoS flow to be transmitted and/or received by UE aggregation)

Step 813: Upon receiving the RRCReconfigurationComplete of the secondary UE, the gNB sends RRCReconfiguration to the primary UE to configure the UE aggregation related information. Wherein the UE aggregation related information includes at least one of the following: the secondary UE's radio configuration information, the second UE's address related parameters. Wherein the secondary UE's address includes at least one of the: UE ID, UE AP ID, the Tunnel Endpoint Identifier (TEID) for UL data forwarding between aggregated UEs, the IP address of the secondary UE, the PC5 tunnel address, the UP Transport Layer Information used for UL data forwarding, Layer-2 ID, sl-DestinationIdentity etc. The secondary UE's radio configuration information include at least one of the: Dedicated Radio Bearer(DRB) configuration, RLC Bearer configuration, logical channel configuration, the mapping between DRB configuration and logical channel configuration, or cell group configuration.

Step 814: The Primary UE sends RRCReconfiguration-Complete to gNB;

Step 815: The gNB sends N2 request ack message to AMF. Wherein the N2 request ack message includes at least one of the following: INITIAL CONTEXT SETUP RESPONSE, UE CONTEXT MODIFICATION RESPONSE, PDU SESSION RESOURCE SETUP RESPONSE, PDU SESSION RESOURCE MODIFY RESPONSE.

Figure 9:
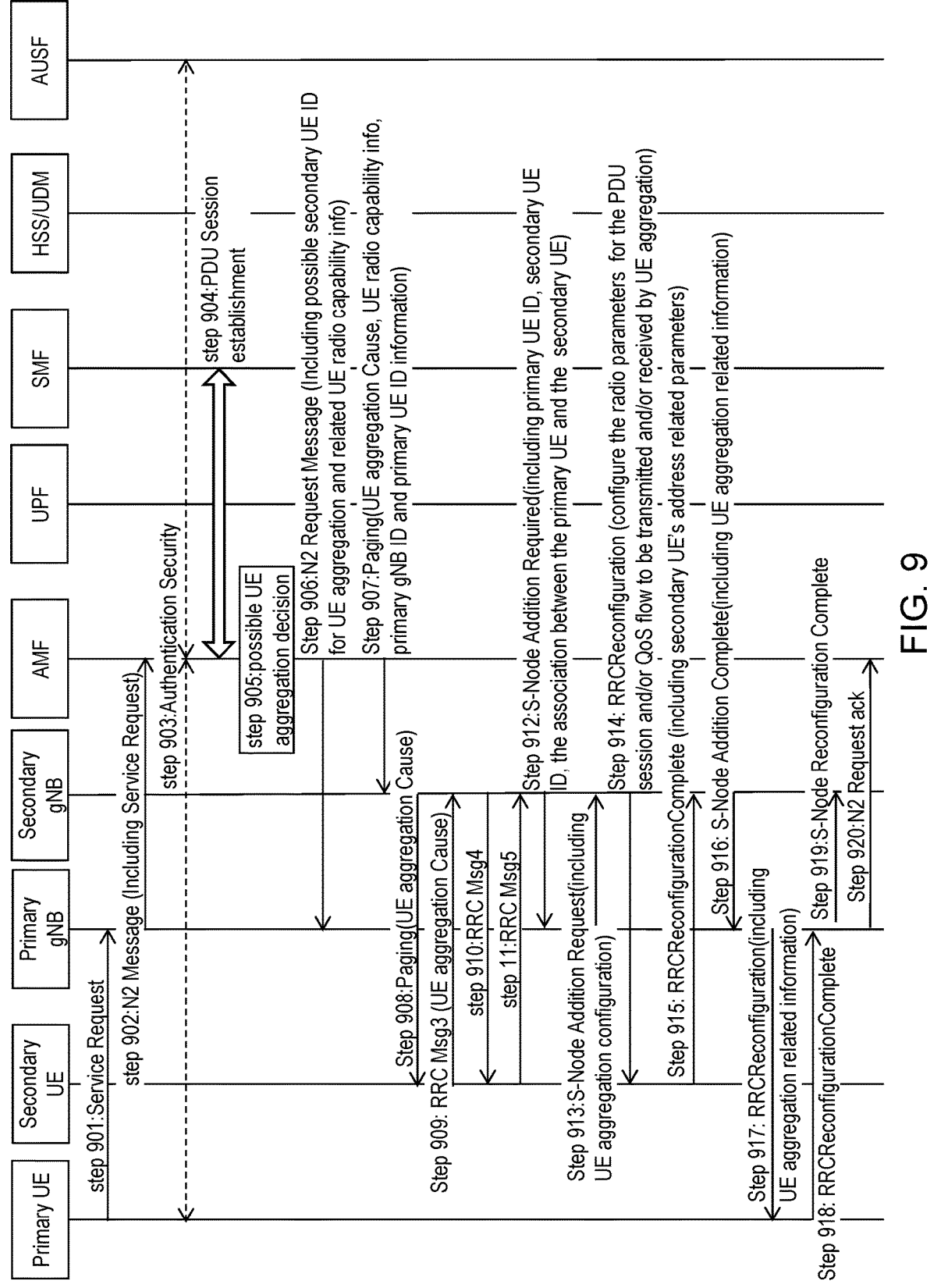
FIG. 9 shows the UE aggregation procedure triggered by Network when primary UE and secondary UE are located in different gNBs

FIG. 9 shows the UE aggregation procedure triggered by Network when primary UE and secondary UE are located in different gNBs. In FIG. 9, Step 901 to Step 906 are same as Step 801 to Step 806 from FIG. 8. And for the subsequent steps:

Step 907: The AMF sends paging message including UE aggregation related information to gNB. Wherein the UE aggregation related information comprises at least one of the following: UE aggregation Cause or indication, UE radio capability of the second UE, primary gNB ID and primary UE ID information.

Step 908: Upon receiving paging message including UE aggregation related information, the gNB sends paging with the UE aggregation cause or UE aggregation indication.

Step 909: Upon receiving the paging with the UE aggregation cause or indication, and UE decides to perform the UE aggregation procedure, the UE sends RRC Msg3 (e.g., RRCResumeRequest, RRCSetupRequest or new RRC Msg) with the UE aggregation cause or UE aggregation indication.

Step 910 is the same as the Step 809, and Step 911 is the same as the Step 810.

Step 912: Upon receiving RRC Msg5, the gNB triggers Xn UE-tunnel establishment (to establish the UE's Xn tunnel between the primary gNB and secondary gNB.). e.g. the secondary gNB sends S-Node Addition Required message including UE aggregation related info to the primary gNB. Wherein the UE aggregation related info includes at least one of the following: primary UE ID, secondary UE ID, the association between primary UE and secondary UE.

Step 913: The primary gNB responses with S-Node Addition Request including UE aggregation configuration to the secondary gNB. Wherein the UE aggregation configuration includes at least one of the following: radio parameters configured by primary gNB based on the primary UE's AS parameters, configuration for the PDU session and/or QoS flow to be transmitted and/or received by UE aggregation, the primary UE's address related parameters for DL data forwarding, Layer-2 ID, sl-DestinationIdentity. Wherein the primary UE's address includes at least one of the: UE ID, UE AP ID, the Tunnel Endpoint Identifier (TEID) for DL data forwarding between aggregated UEs, the IP address of the primary UE, the PC5 tunnel address, the UP Transport Layer Information used for DL data forwarding, Layer-2 ID, sl-DestinationIdentity etc.

Step 914 is the same as the Step 811, and Step 915 is the same as the Step 812.

Step 916: The secondary sends S-Node Addition complete including UE aggregation related information to the primary gNB. Till now, the Xn UE-tunnel has been established. Wherein the UE aggregation related information includes at least one of the following: the secondary UE radio configuration info, the second UE's address related parameters. Wherein the secondary UE's address includes at least one of the: UE ID, UE AP ID, the Tunnel Endpoint Identifier (TEID) for UL data forwarding between aggregated UEs, the IP address of the secondary UE, the PC5 tunnel address, the UP Transport Layer Information used for UL data forwarding, Layer-2 ID, sl-DestinationIdentity etc.

Step 917 is the same as the Step 813, Step 918 is the same as the Step 814

Step 919: The primary gNB sends S-Node reconfiguration complete message to the secondary gNB. Till now, the UE aggregation transmission and/or reception can be performed.

The Step 920 can be the same as the Step 815.

Figure 10:
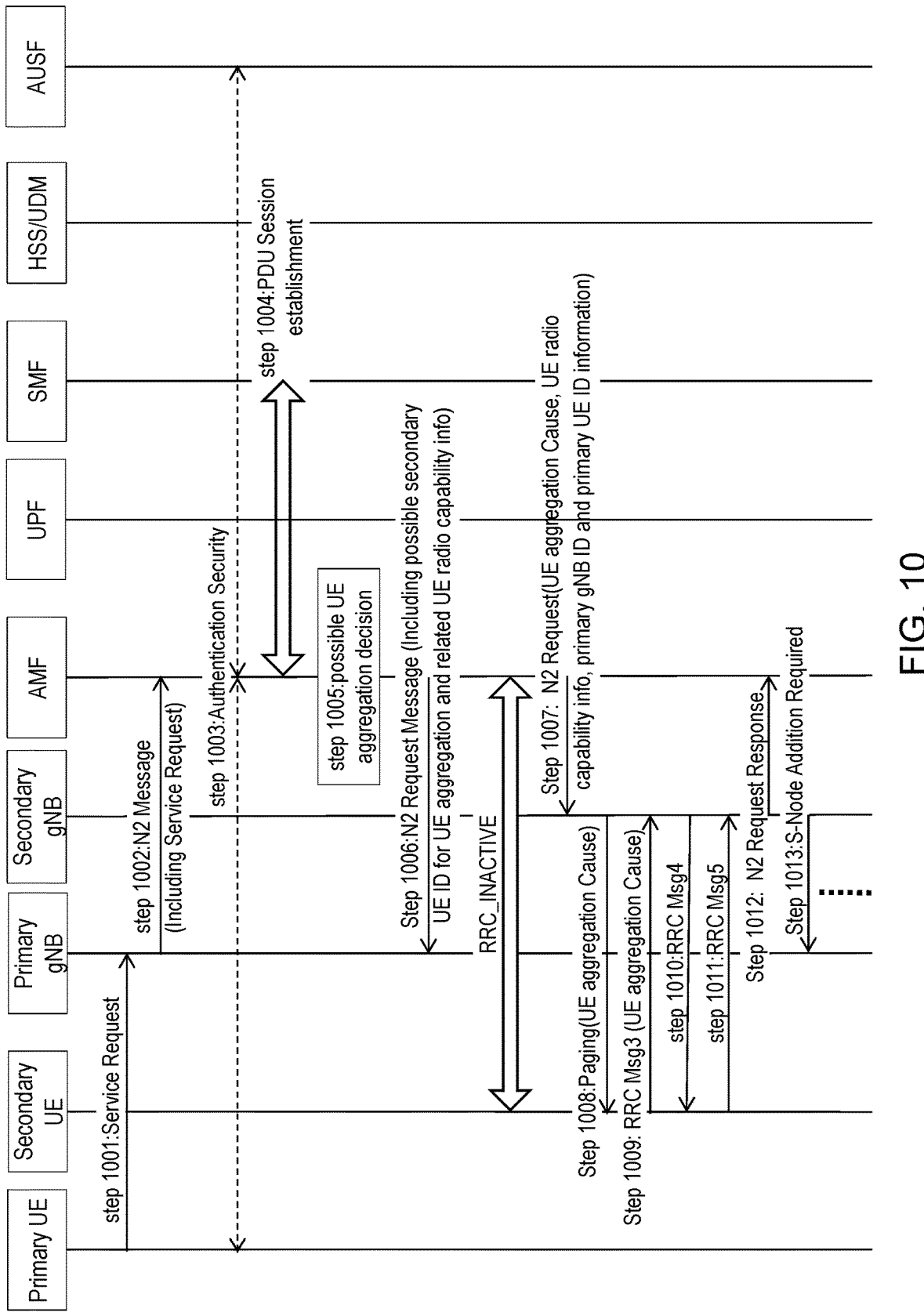
FIG. 10 shows the UE aggregation procedure triggered by Network when the secondary UE is in RRC_INACTIVE state.

FIG. 10 shows the UE aggregation procedure triggered by Network when the secondary UE is in RRC_INACTIVE state. In FIG. 10, Step 1001 to Step 1006 are same as Step 901 to Step 906 from FIG. 9. And for the subsequent steps, the difference between the steps in FIG. 10 from the steps in the FIG. 9 is that:

In step 1007, since the secondary UE is in RRC_INACTIVE state, the AMF sends N2 request message to the second gNB (while in 907, the AMF sends Paging message to the second gNB for the secondary UE is in RRC_IDLE state).

And in step 1012, the secondary gNB sends N2 request ack to AMF (while in FIG. 9, there is no ack message for paging).

From the step that the secondary gNB triggers Xn UE-tunnel establishment (e.g. sends S-Node Addition Required message to the primary gNB), the procedure is the same as that in FIG. 9.

Figure 11:
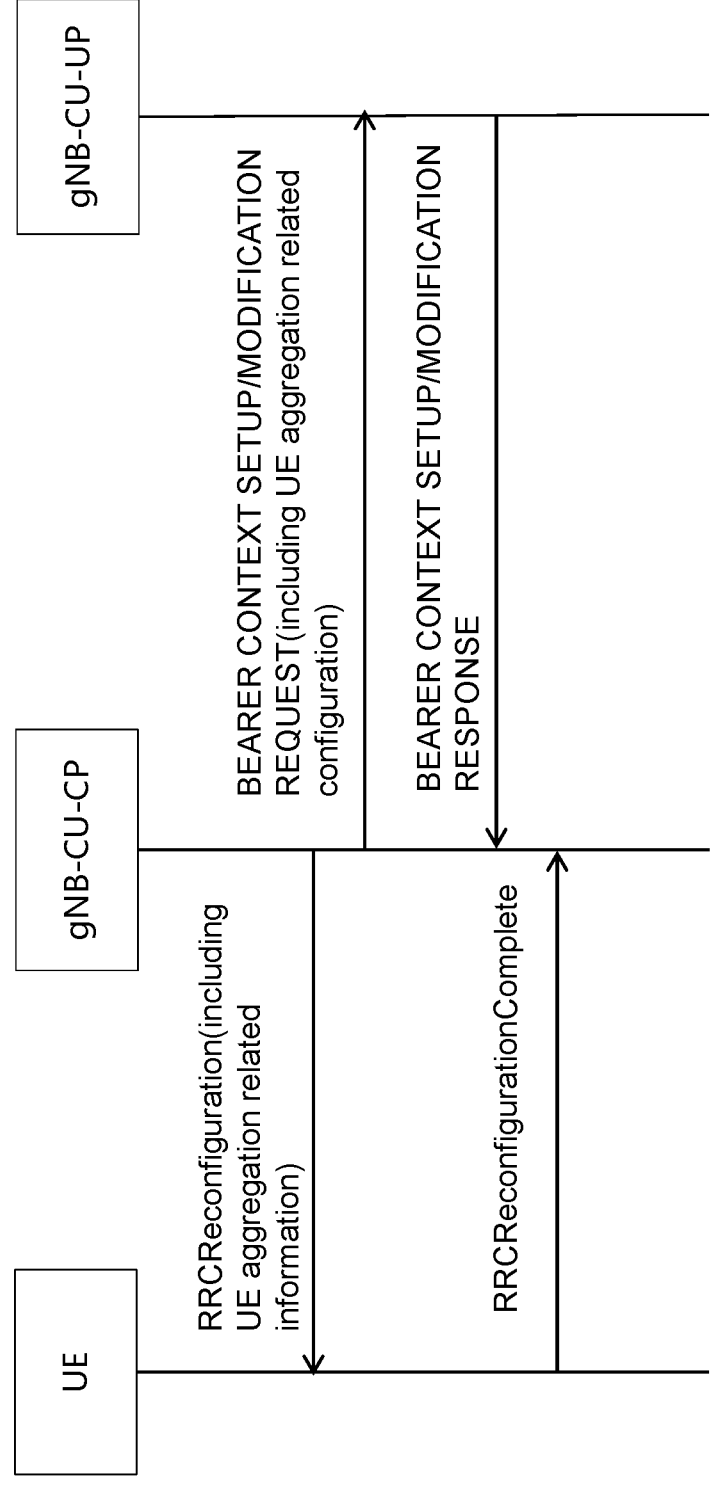
FIG. 11 shows the UE aggregation procedure for CU-CP and CU-UP split case.

FIG. 11 shows the UE aggregation procedure for CU-CP and CU-UP split case. For CU-CP and CU-UP split case, when the gNB-CU-CP sends the RRCConfiguration including UE aggregation related information, it should also sends the BEARER CONTEXT SETUP REQUEST including UE aggregation related configuration or BEARER CONTEXT MODIFICATION REQUEST including UE aggregation related configuration to gNB-CU-UP.

Wherein the UE aggregation related configuration includes at least one of the following: UE aggregation related radio configuration, UE aggregation related data forwarding address. Wherein the UE aggregation related data forwarding address includes at least one of the: the primary UE's UE ID, the secondary UE's UE ID, the primary UE's UE AP ID, the secondary UE's UE AP ID, UE aggregation related GTP Tunnel configuration, the Tunnel Endpoint Identifier (TEID) for data forwarding between gNBs, the Tunnel Endpoint Identifier (TEID) for data forwarding between UE and gNB, the Transport Layer Address for data forwarding between gNBs, the Transport Layer Address for data forwarding between aggregated UE and gNB.

Figure 12:
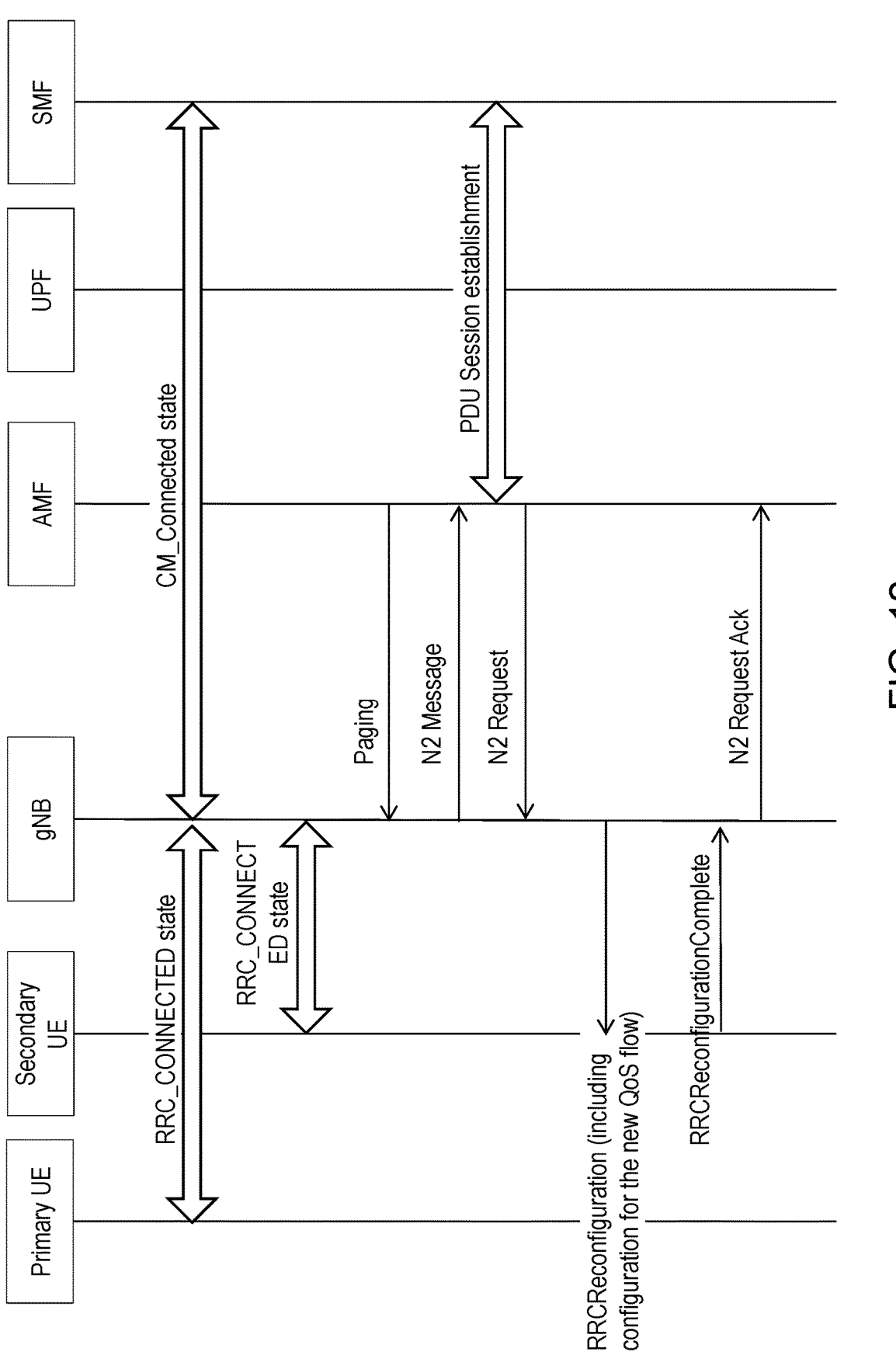
FIG. 12 shows the concurrent MT service setup for the secondary UE.

FIG. 12 shows the concurrent MT service setup for the secondary UE. In FIG. 12, the secondary UE has RRC connection, but has not CM connection.

When the gNB receives paging for the secondary UE, the gNB constructs the N2 message with MT service request cause and sends N2 message to AMF(e.g. not sends paging to UE), and triggers the PDU session and N2 connection establishment.

When the gNB receives N2 request message, the gNB sends RRCReconfiguration including radio configuration for the new QoS flow to the UE. Wherein the N2 message is the INITIAL CONTEXT SETUP REQUEST.

Figure 13:
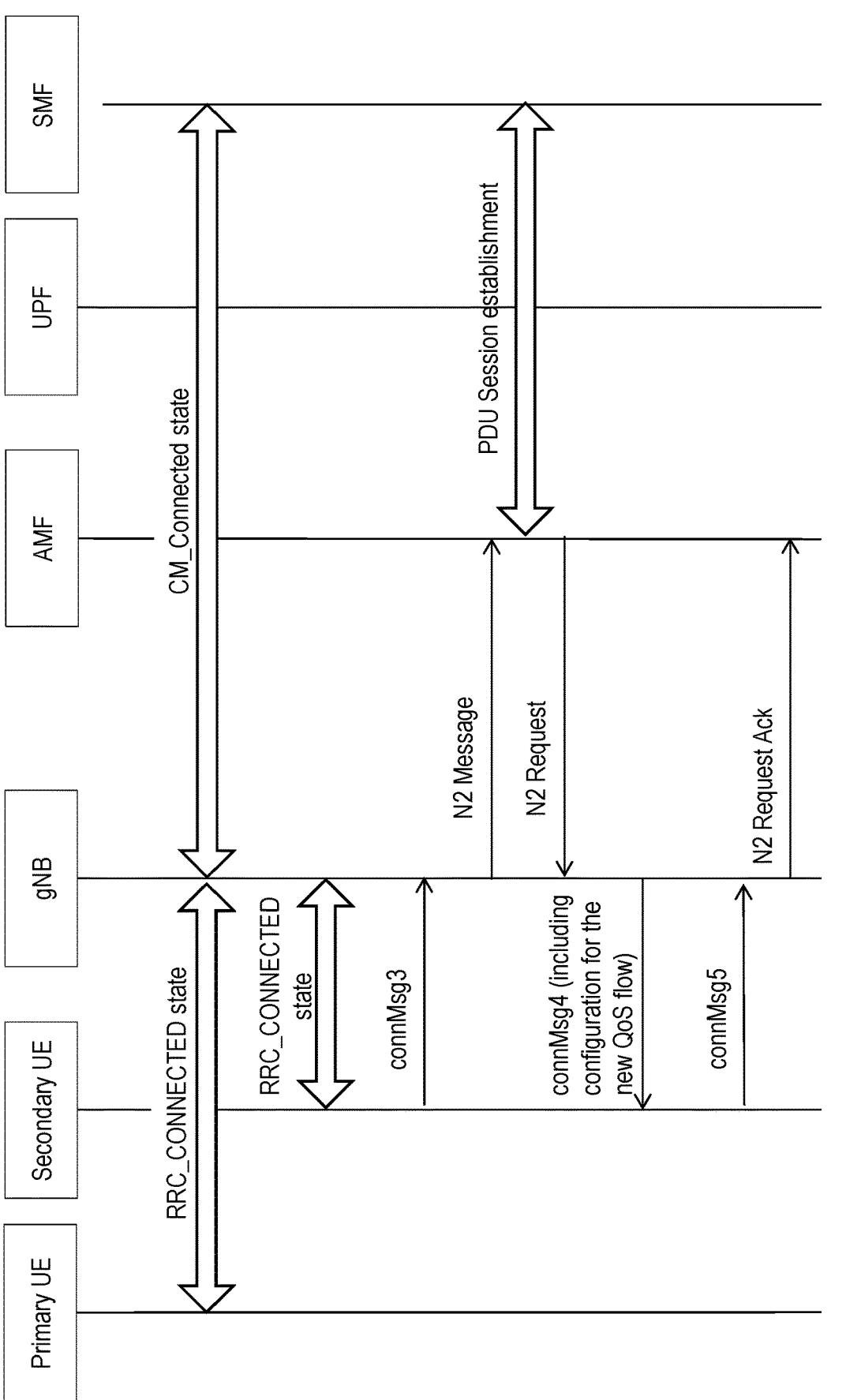
FIG. 13 shows the concurrent MO service setup for the secondary UE.

FIG. 13 shows the concurrent MO service setup for the secondary UE. In FIG. 13, the secondary UE has RRC connection, but has not CM connection. The secondary UE triggers a concurrent MO service setup procedure:

The secondary UE sends a connection state Msg3 with the cause MO or MO for triggered by aggregation UE to gNB, wherein the connMsg3 may be a RRC Msg including NAS PDU (e.g., RRCReconfigurationRequest or RRCReestablishmentRequest, ULInformationTransfer, UEAssistanceInformation), or a NAS message.

When receiving the connection state Msg3, if the N2 connection has not been established, and/or the cause of the Msg3 is MO or MO for triggered by aggregation UE, the gNB sends N2 message to AMF, and triggers the PDU session and N2 connection establishment.

If the connection state Msg3 is RRCReconfigurationRequest, RRC Msg including NAS PDU or NAS message, the Msg4 will be RRCReconfiguration, and Msg5 is RRCReconfigurationComplete.

If the connection state Msg3 is RRCReestablishmentRequest message, the Msg4 will be RRCReestablishment, and Msg5 is RRCReestablishmentComplete.

Figure 14A:
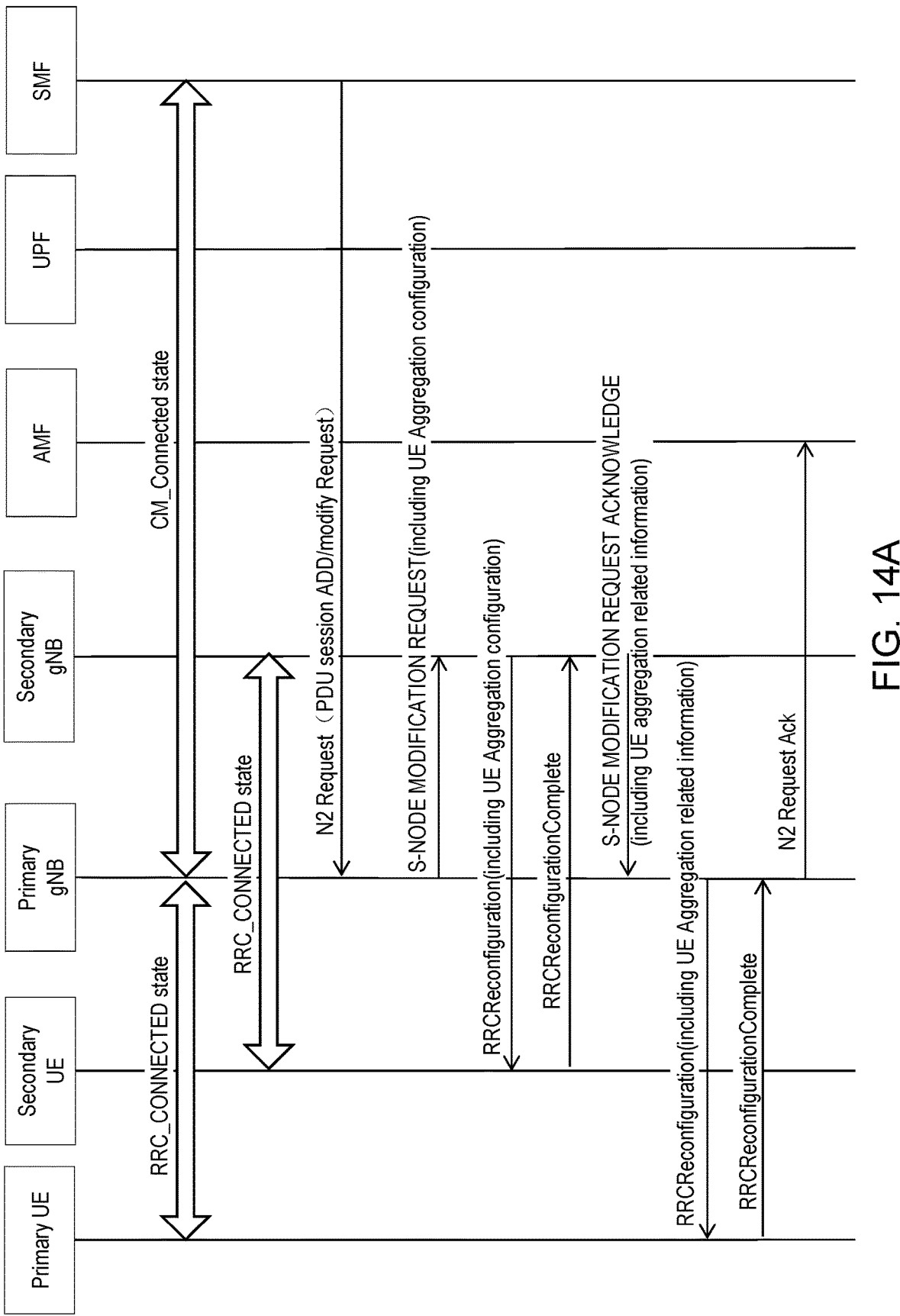
FIG. 14A shows the concurrent service setup for the primary UE or anchor UE.

FIG. 14A shows the concurrent aggregation service setup for the primary UE. In FIG. 14A, the secondary UE has RRC connection, but has not CM connection. The Primary UE triggers a concurrent aggregation service setup procedure:

The primary gNB (e.g. gNB connecting the primary UE) triggers Xn UE-tunnel update. e.g. The primary gNB sends S-NODE MODIFICATION REQUEST including UE Aggregation configuration to the secondary gNB. Wherein the UE aggregation configuration includes at least one of the: radio parameters based on the primary UE's AS parameters, configuration for the PDU session and/or QoS flow to be transmitted and/or received by UE aggregation, the primary UE's address related parameters for DL data forwarding. Wherein the primary UE's address includes at least one of the: UE ID, UE AP ID, the Tunnel Endpoint Identifier (TEID) for DL data forwarding between aggregated UEs, the IP address of the primary UE, the PC5 tunnel address, the UP Transport Layer Information used for DL data forwarding, Layer-2 ID, sl-DestinationIdentity etc.

The secondary gNB sends RRCReconfiguration including UE Aggregation configuration to UE.

Upon receiving RRCReconfigurationComplete, the secondary gNB sends S-NODE MODIFICATION REQUEST ACKNOWLEDGE including UE aggregation related information to primary gNB. Wherein the UE aggregation related information includes at least one of the following: the secondary UE radio configuration info, the second UE's address related parameters. Wherein the UE's address includes at least one of the: UE ID, UE AP ID, the Tunnel Endpoint Identifier (TEID) for UL data forwarding between aggregated UEs, the IP address of the secondary UE, the PC5 tunnel address, the UP Transport Layer Information used for UL data forwarding, Layer-2 ID, sl-DestinationIdentity etc.

And then the primary gNB sends the RRCReconfiguration including UE aggregation related information to primary UE.

Figure 14B:
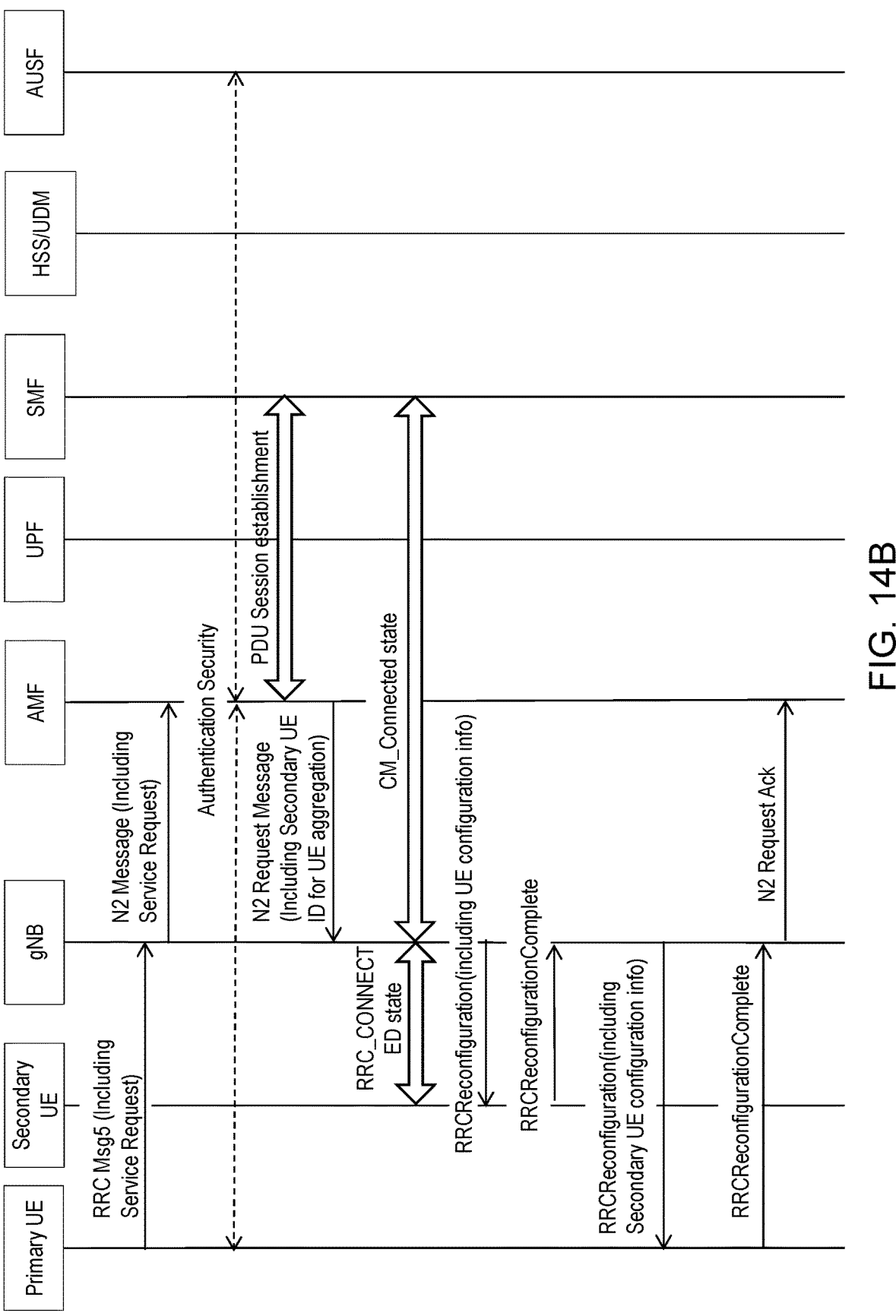
FIG. 14B shows the UE aggregation procedure when the secondary UE is in RRC_CONNECTED state.

FIG. 14B shows the UE aggregation procedure when the secondary UE is in RRC_CONNECTED state. In FIG. 14B, the procedure is similar as that in FIG. 10, except:

Upon the gNB receive the N2 request message, it triggers RRCReconfiguration for the secondary UE.

Where the N2 message includes at least one of the following: UE CONTEXT MODIFICATION REQUEST, PDU SESSION RESOURCE SETUP REQUEST.

Upon on receiving the RRCReconfiguration with the UE aggregation configuration and the secondary UE does not intend to perform the UE aggregation, it can send RRCReconfigureFailure with cause of UE aggregation reject.

Upon receiving RRCReconfigureFailure with cause of UE aggregation reject, or the eNB does not receive RRCReconfigureComplete message within a predefined period, then the UE aggregation procedure ends and the secondary UE does not join in the UE aggregation procedure.

Figure 15:
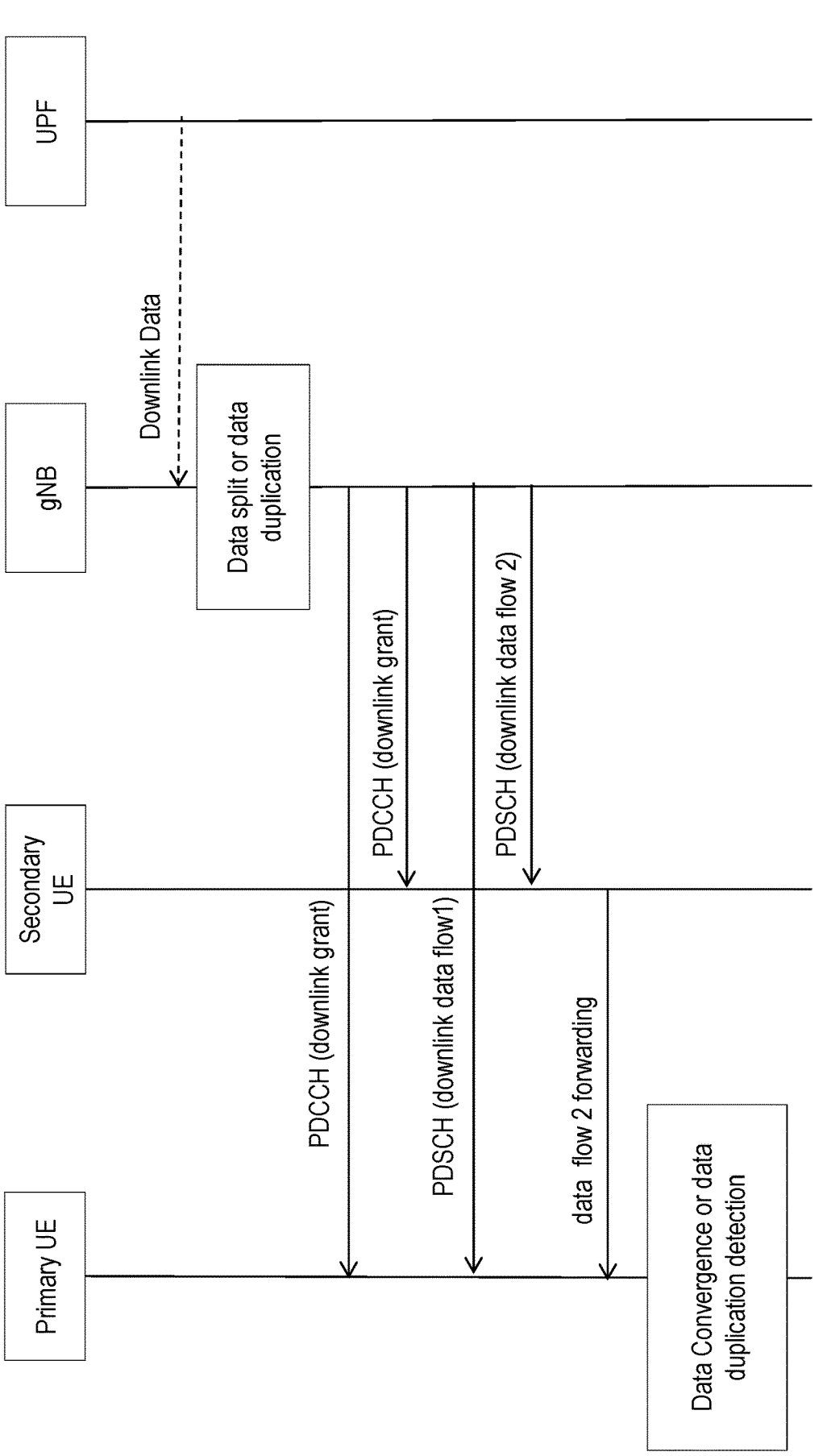
FIG. 15 shows the user plane downlink data flow for UE aggregation case.

FIG. 15 shows the user plane downlink data flow for UE aggregation case. In FIG. 15, upon receiving downlink data, the gNB (PDCP) performs data split or data duplication for different UEs and sends the data flows to the different RLC/MAC entity corresponding to the UEs. And gNB schedules the downlink grant for each UE, and then transmits the downlink data to UEs on the downlink grants.

Upon receiving the downlink data, the secondary UE forwards it to PDCP entity of the primary UE The primary PDCP of the primary UE performs the downlink data convergence and reordering, and then delivers to higher layers.

Figure 16:
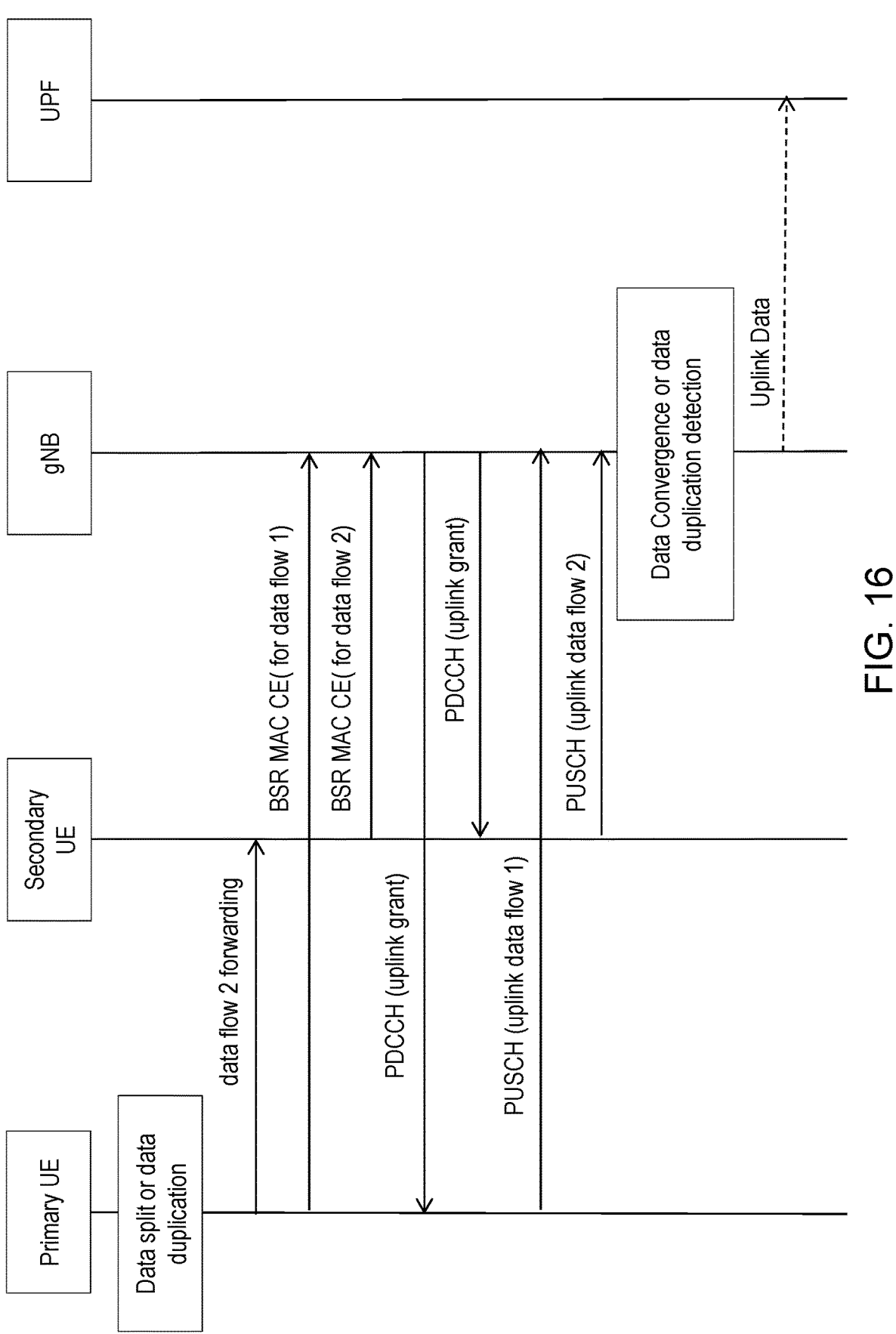
FIG. 16 shows the user plane uplink data flow for UE aggregation case.

FIG. 16 shows the user plane uplink data flow for UE aggregation case. In FIG. 16, upon receiving uplink data, the primary UE (PDCP) performs data split or data duplication for different UEs and sends the data flows to the different RLC/MAC entity corresponding to the UEs.

Each UE sends SR and/or BSR based on its own buffer size.

gNB schedules the uplink grant for each UE based on the BSR, and each UE transmits the uplink data to gNB on the uplink grants.

Upon receiving the uplink data, the RLC entity corresponding to the secondary UE forwards it to PDCP entity corresponding to the primary UE The PDCP corresponding to the primary UE performs the uplink data convergence and reordering, and then delivers to higher layers.

Figure 17:
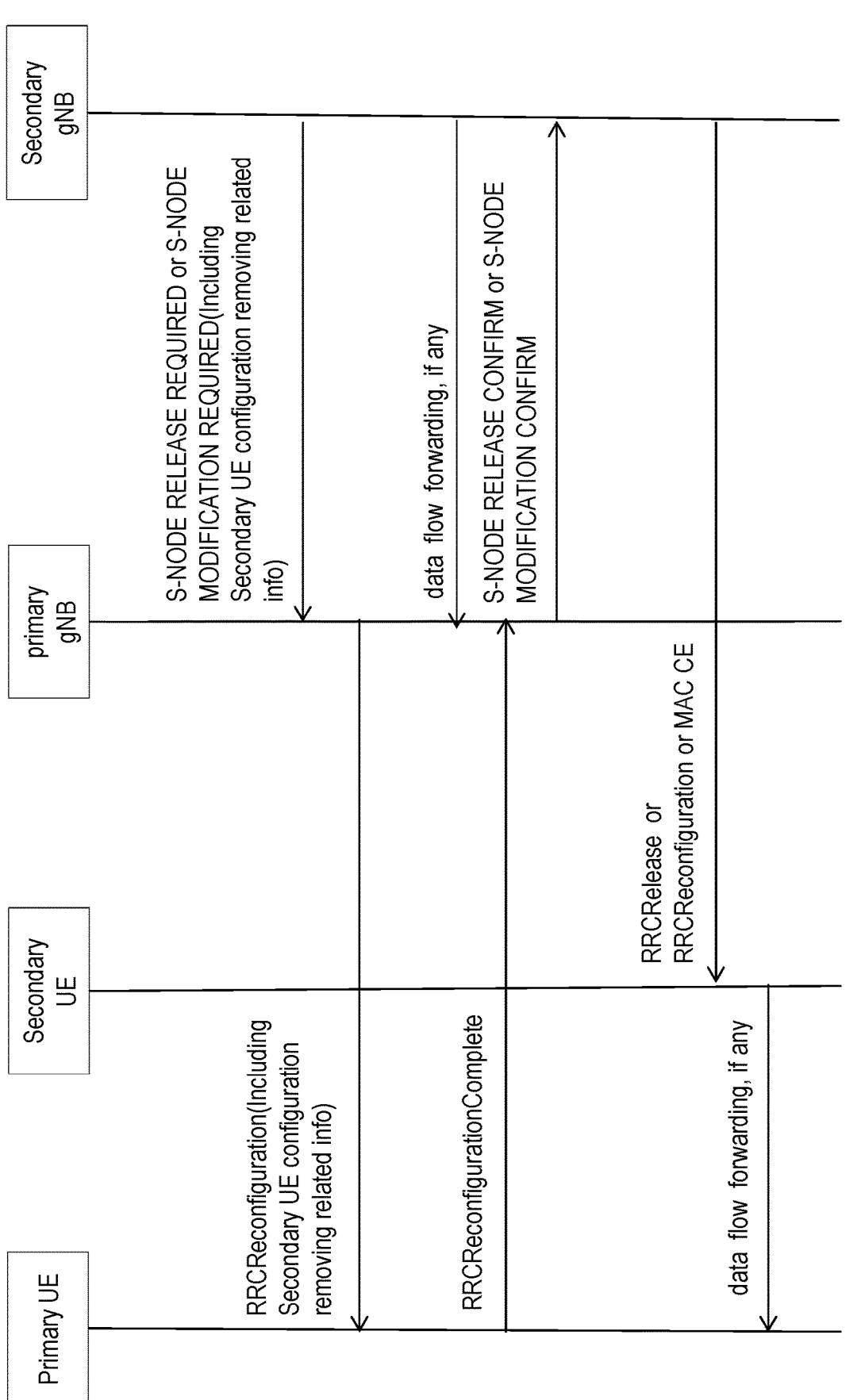
FIG. 17 shows the Secondary UE removing procedure triggered by secondary gNB.

FIG. 17 shows the Secondary UE removing procedure triggered by secondary gNB. In FIG. 17, the secondary gNB sends S-NODE RELEASE REQUIRED or S-NODE MODIFICATION REQUIRED (Including Secondary UE configuration removing related info) to the primary gNB to trigger to release the secondary UE. If the secondary UE and primary UE locates in same gNB, this step is skipped.

If there is any UL data received or DL data to be transmitted corresponding to the removed radio bearer of UE aggregation, the secondary gNB forwards them to the primary gNB's PDCP entity corresponding to the removed radio bearer of UE aggregation.

The primary gNB sends RRCReconfiguration including Secondary UE configuration removing related info to primary UE.

The primary gNB sends S-NODE RELEASE CONFIRM or S-NODE MODIFICATION CONFIRM to the secondary gNB. If the secondary UE and primary UE locates in same gNB, this step is skipped.

The secondary gNB sends RRCRelease message to the secondary UE release the RRCConnection, or sends RRCReconfiguration message to the secondary UE release the radio bearer corresponding to the UE aggregation, or sends MAC CE to the secondary UE release the radio bearer corresponding to the UE aggregation. Wherein the MAC CE is 0 bits identified by a specific LCID.

Upon receiving the RRCRelease or the RRCReconfiguration message or MAC CE, if there is any UL data to be transmitted or DL data received corresponding to the removed radio bearer of UE aggregation, the secondary UE forwards them to the PDCP entity of the primary UE.

The RRCRelease message or RRCReconfiguration message sent to the secondary UE can also before RRCReconfiguration message sent to the primary UE, e.g. the RRCRelease message or RRCReconfiguration message sent to the secondary UE is closely before or after the S-NODE RELEASE REQUIRED or S-NODE MODIFICATION REQUIRED message.

Figure 18:
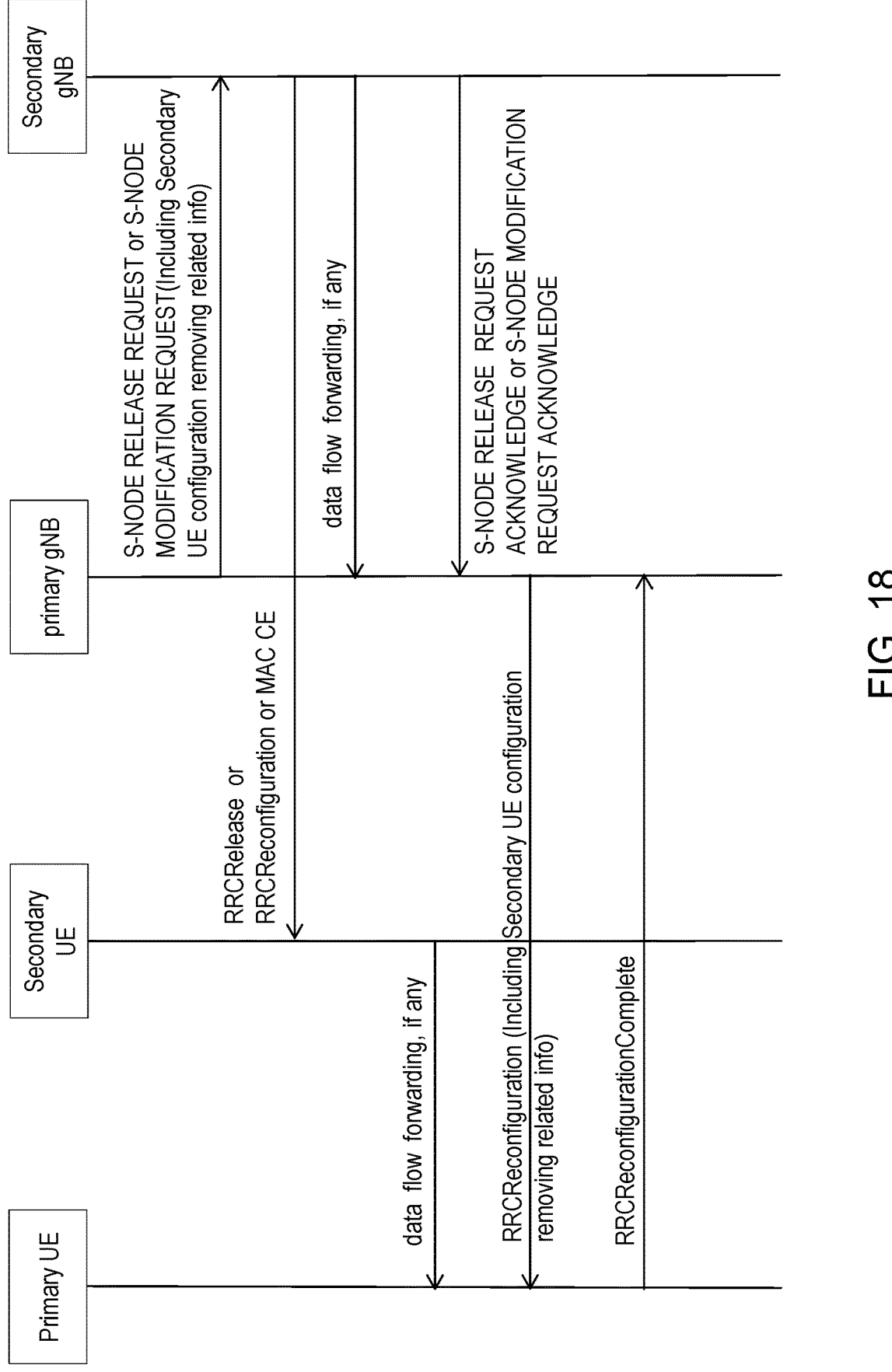
FIG. 18 shows the Secondary UE removing procedure triggered by primary gNB.

FIG. 18 shows the Secondary UE removing procedure triggered by primary gNB. In FIG. 18, the primary gNB requests to remove one secondary UE of UE aggregation. The Primary gNB sends S-NODE RELEASE REQUEST or S-NODE MODIFICATION REQUEST (e.g., including Secondary UE configuration removing related info) to the secondary gNB to trigger to release the secondary UE.

The secondary gNB sends RRCRelease message, RRCReconfiguration message or MAC CE to the secondary UE to release the radio bearer corresponding to the UE aggregation. Wherein the MAC CE is 0 bits identified by a specific LCID (e.g., only MAC subheader is used).

Upon receiving the RRCRelease, the RRCReconfiguration message or MAC CE, if there is any UL data to be transmitted or DL data received corresponding to the removed radio bearer of UE aggregation, the secondary UE forwards them to the PDCP entity of the primary UE. If the secondary UE and primary UE locates in same gNB, this step is skipped.

If there is any UL data received or DL data to be transmitted corresponding to the removed radio bearer of UE aggregation, the secondary gNB forwards them to the primary gNB's PDCP entity corresponding to the removed radio bearer of UE aggregation.

The secondary gNB sends S-NODE RELEASE REQUEST ACKNOWLEDGE or S-NODE MODIFICATION REQUEST ACKNOWLEDGE to the primary gNB. If the secondary UE and primary UE locates in same gNB, this step is skipped.

The primary gNB sends RRCReconfiguration including Secondary UE configuration removing related info to primary UE.

The RRCReconfiguration message sent to the primary UE can also before the RRCRelease message or RRCReconfiguration message sent to the secondary UE, e.g. RRCReconfiguration message sent to the primary UE is closely before or after the S-NODE RELEASE REQUEST or S-NODE MODIFICATION REQUEST message.

Figure 19:
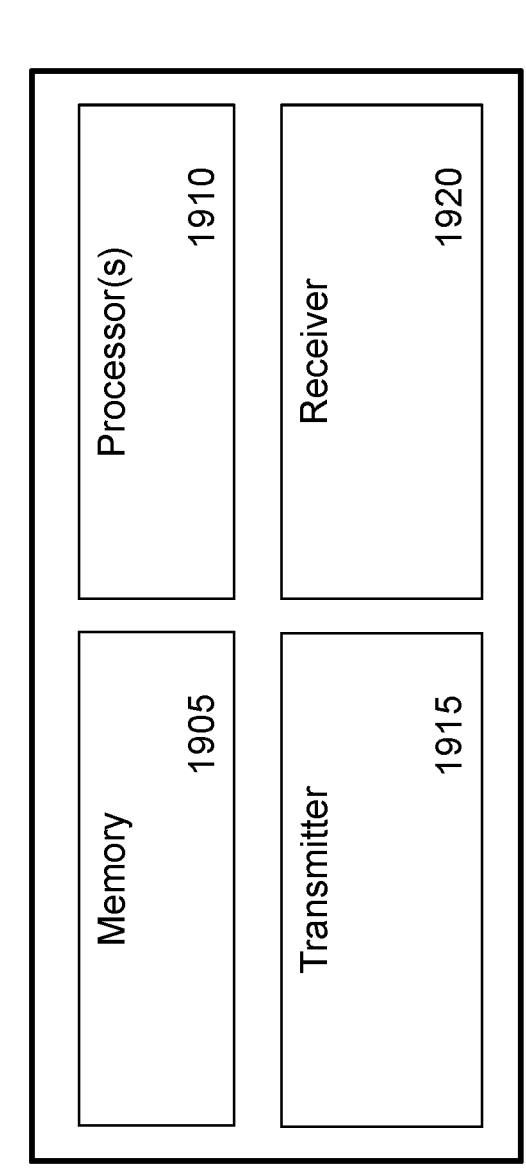
FIG. 19 shows an exemplary block diagram of a hardware platform that may be a part of a network device or a user equipment.

FIG. 19 shows an exemplary block diagram of a hardware platform 1900 that may be a part of a network device (e.g., base station) or a communication device (e.g., user equipment). The hardware platform 1900 includes at least one processor 1910 and a memory 1905 having instructions stored thereupon. The instructions upon execution by the processor 1910 configure the hardware platform 1900 to perform the operations described in FIGS. 1 to 18 and 20 to 27 and in the various embodiments described in this patent document. The transmitter 1915 transmits or sends information or data to another device. For example, a network device transmitter can send a message to a user equipment. The receiver 1920 receives information or data transmitted or sent by another device. For example, a user equipment can receive a message from a network device.

Figure 20:
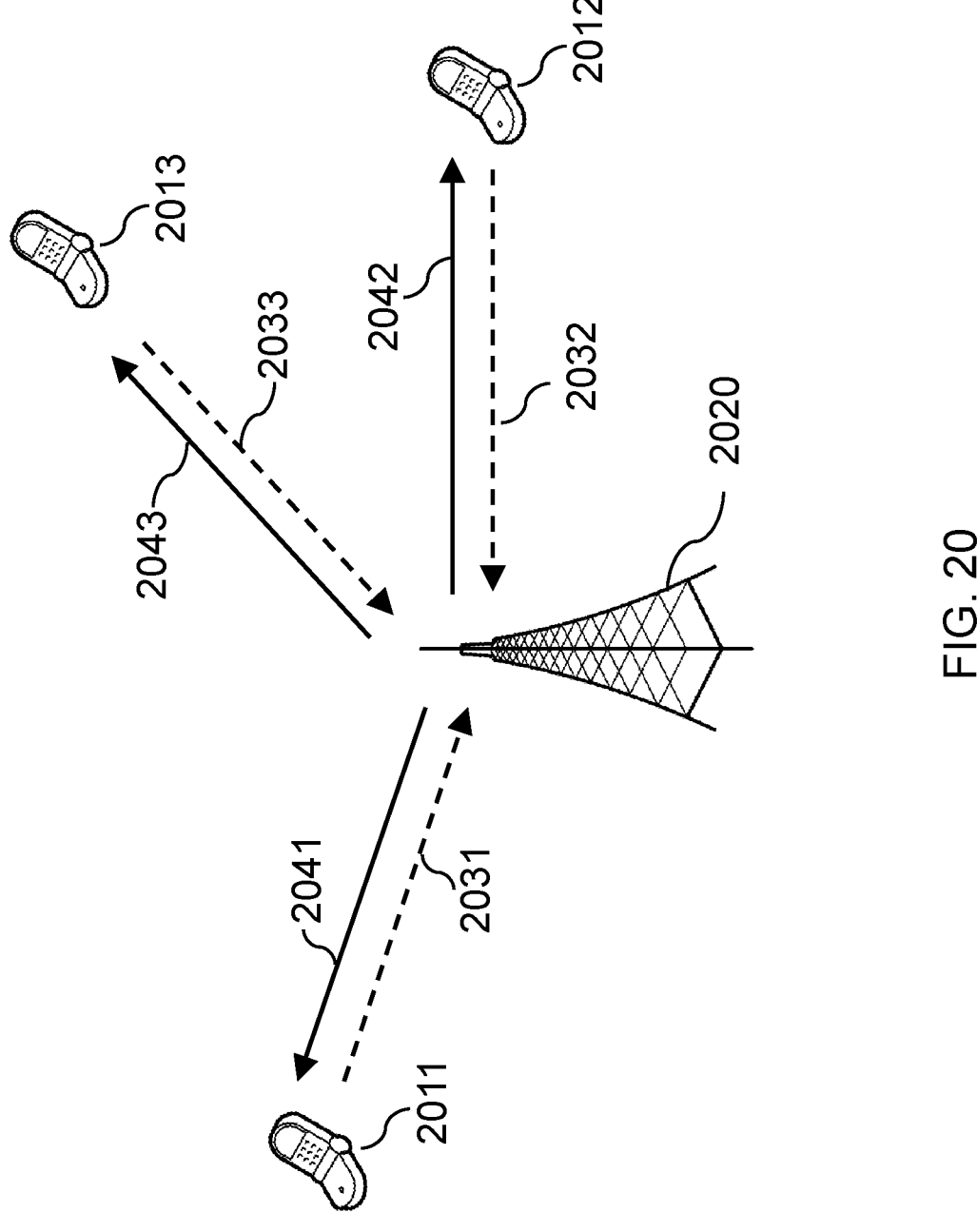
FIG. 20 shows an example of wireless communication including a base station (BS) and user equipment (UE) based on some implementations of the disclosed technology.

The implementations as discussed above will apply to a wireless communication. FIG. 20 shows an example of a wireless communication system (e.g., a 5G or NR cellular network) that includes a base station 2020 and one or more user equipment (UE) 2011, 2012 and 2013. In some embodiments, the UEs access the BS (e.g., the network) using a communication link to the network (sometimes called uplink direction, as depicted by dashed arrows 2031, 2032, 2033), which then enables subsequent communication (e.g., shown in the direction from the network to the UEs, sometimes called downlink direction, shown by arrows 2041, 2042, 2043) from the BS to the UEs. In some embodiments, the BS send information to the UEs (sometimes called downlink direction, as depicted by arrows 2041, 2042, 2043), which then enables subsequent communication (e.g., shown in the direction from the UEs to the BS, sometimes called uplink direction, shown by dashed arrows 2031, 2032, 2033) from the UEs to the BS. The UE may be, for example, a smartphone, a tablet, a mobile computer, a machine to machine (M2M) device, an Internet of Things (IoT) device, and so on.

In the example flowcharts described in FIGS. 21-27, the terms described below on the left hand side may refer to terms on the right hand side as further described in this patent document:

First network device may include primary gNB

Second network device may include secondary gNB

One or more communication devices may include one or more secondary UEs

First communication device may include primary UE

Second communication device may include secondary UE

First message may include RRCReconfiguration (Step 811) or RRCReconfiguration (step 914) or RRCReconfiguration (step 917)

Second message may include RRCReconfigurationComplete (Step 812) or RRCReconfiguration complete (step 915)

Third message may include RRCReconfiguration (Step 813)

Fourth message may include RRC Msg 3 (step 808)

Fifth message may include paging (step 807)

Sixth message may include N2 request (step 806)

Seventh message may include S-Node Addition complete (step 916)

Eighth message may include S-Node addition request (step 913)

Ninth message may include S-Node addition required (step 912)

Tenth message may include N2 request message (step 906)

FIG. 21 shows an exemplary flowchart for facilitating an aggregation operation. Operation 2102 includes transmitting, by a network device to a second communication device, a first message that triggers the second communication device to perform an aggregation operation, wherein the second communication device is from a list of one or more communication devices received by the network device from a core network device for performing the aggregation operation or from a first communication device. Operation 2104 includes receiving, from the second communication device, a second message comprising a second configuration information of the second communication device. Operation 2106 includes transmitting, to the first communication device and in response to the receiving the second message, a third message comprising second configuration information of the second communication device.

In some embodiments, the second configuration information in the third message comprises any one or more of: one or more address related parameters of the second communication device, or an aggregated data volume information of the second communication device. In some embodiments, the third message further comprises a radio configuration information configured for the second communication device. In some embodiments, the first message comprises any one or more of: a first configuration information of the first communication device for the aggregation operation, a first configuration for a protocol data unit (PDU) session of a transmission or of a reception by the aggregation operation, or a second configuration for a quality of service (QoS) flow of the transmission or of the reception by the aggregation operation.

FIG. 22 shows an exemplary flowchart for facilitating an aggregation operation. Operation 2202 includes transmitting, by a network device to one or more communication devices in an idle state or an inactive state a fifth message that comprises an aggregation indication configured to trigger at least one communication device from the one or more communication devices to perform an aggregation operation.

In some embodiments, the network device receives a fourth message from a second communication device after transmitting to the one or more communication devices the fifth message, and the fourth message comprises an aggregation indication that indicates that the second communication device requests to perform the aggregation operation. In some embodiments, the network device transmits the fifth message in response to receiving a sixth message comprising an aggregation related information that includes any one or more of: an address of the first communication device, a first list of one or more identifiers of the one or more communication devices for performing the aggregation operation, a second list of communication device identifiers that belong to a same user, a third list of one or more identifiers of cells on which the second communication device camp, a fourth list of one or more identifiers of network devices on which the second communication device camp, a radio capability of the second communication device, or an identifier of the radio capability of the second communication device. In some embodiments, the network device receives the sixth message comprising the aggregation related information from a core network device. In some embodiments, the network device receives the aggregation related information from the first communication device or from the second communication device. In some embodiments, the core network device includes an access and mobility management function (AMF).

In some embodiments, the method further includes transmitting or receiving, by the network device, data with the first communication device using the aggregation operation. In some embodiments, the transmitting the data using the aggregation operation comprises: transmitting a first packet data convergence protocol (PDCP) protocol data unit (PDU) set corresponding to the data to the second communication device and transmitting a second PDCP PDU set corresponding to the data to the first communication device, or transmitting the data to the second communication device and the first communication device. In some embodiments, the receiving the data using the aggregation operation comprises: receiving a first packet data convergence protocol (PDCP) protocol data unit (PDU) set corresponding to the data from the second communication device and receiving a second PDCP PDU set corresponding to the data from the first communication device, or receiving the data from the second communication device and the first communication device.

Figure 23:
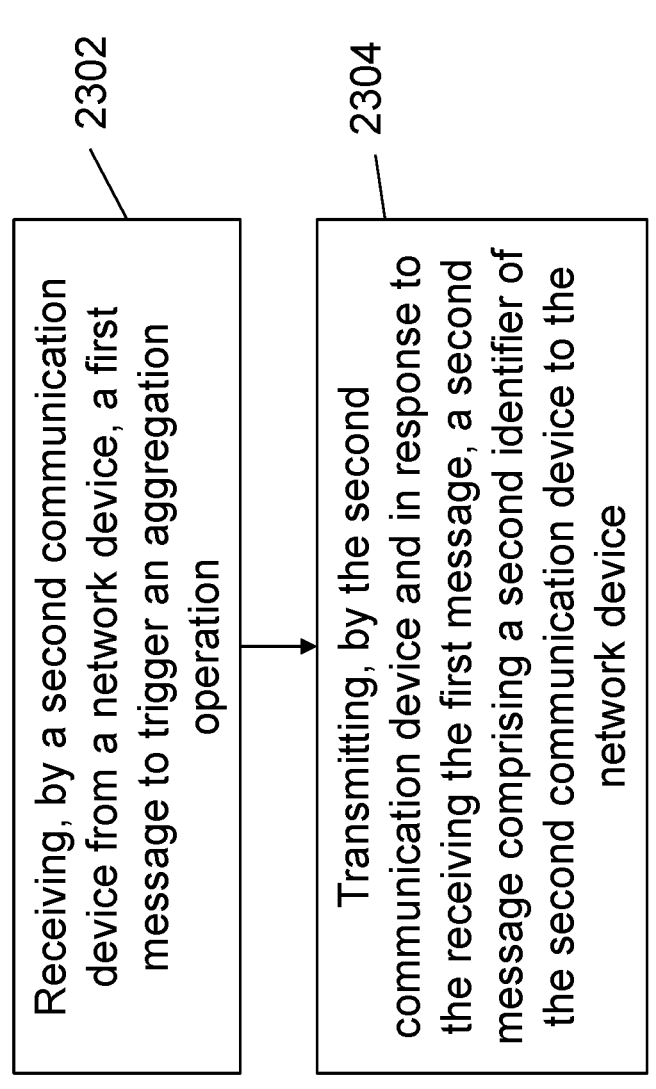

FIG. 23 shows an exemplary flowchart for facilitating an aggregation operation. Operation 2302 includes receiving, by a second communication device from a network device, a first message to trigger an aggregation operation. Operation 2304 includes transmitting, by the second communication device and in response to the receiving the first message, a second message comprising a second identifier of the second communication device to the network device.

In some embodiments, the first message comprises a first configuration information of a first communication device and any one or more of: a first configuration for a protocol data unit (PDU) session of a transmission or of a reception by the aggregation operation, or a second configuration for a quality of service (QoS) flow of the transmission or of the reception by the aggregation operation. In some embodiments, the second communication device transmits, to an access and mobility management function (AMF), a registration request message comprising an aggregation capability indication that indicates that second communication device supports a performance of the aggregation operation.

FIG. 24 shows an exemplary flowchart for facilitating an aggregation operation. Operation 2402 includes receiving, by a second communication device from the second network device, a fifth message that comprises an aggregation indication configured to trigger the second communication device to perform the aggregation operation.

In some embodiments, the second communication device sends a fourth message to the second network device after receiving from the communication device the fifth message, and the fourth message comprises an aggregation indication that indicates that the second communication device requests to perform the aggregation operation.

FIG. 25 shows an exemplary flowchart for facilitating an aggregation operation. Operation 2502 includes transmitting, by a second network device to a second communication device, a first message that triggers the second communication device to perform an aggregation operation. Operation 2504 includes receiving, from the second communication device and in response to the transmitting the first message, a second message comprising a second configuration information of the second communication device. Operation 2506 includes transmitting, to a first network device and in response to the receiving the second message, a seventh message comprising a first aggregation related information.

In some embodiments, the first message comprises any one or more of: a first identifier of the first communication device, a first configuration for a protocol data unit (PDU) session of a transmission or of a reception by the aggregation operation, or a second configuration for a quality of service (QoS) flow of the transmission or of the reception by the aggregation operation. In some embodiments, the first aggregation related information includes any one or more of: a first list of one or more identifiers of one or more communication devices for performing the aggregation operation, wherein the one or more communication devices includes the second communication device, a second list of communication device identifiers that belong to a same user, a radio capability of the second communication device, or an identifier of the radio capability of the second communication device. In some embodiments, the first message is transmitted in response to the second network device receiving an eighth message from the first network device, wherein the eighth message comprises an aggregation configuration information. In some embodiments, the aggregation configuration information in the eighth message includes any one or more of: one or more radio parameters of the second network device, a first configuration for a protocol data unit (PDU) session of a transmission or of a reception by the aggregation operation, a second configuration for a quality of service (QoS) flow of the transmission or of the reception by the aggregation operation, or a first configuration information of the first communication device for the aggregation operation. In some embodiments, the eighth message is received in response to the second communication device transmitting a ninth message to a first network device, wherein the ninth message requests an addition of the second network device for the aggregation operation.

Figure 26:
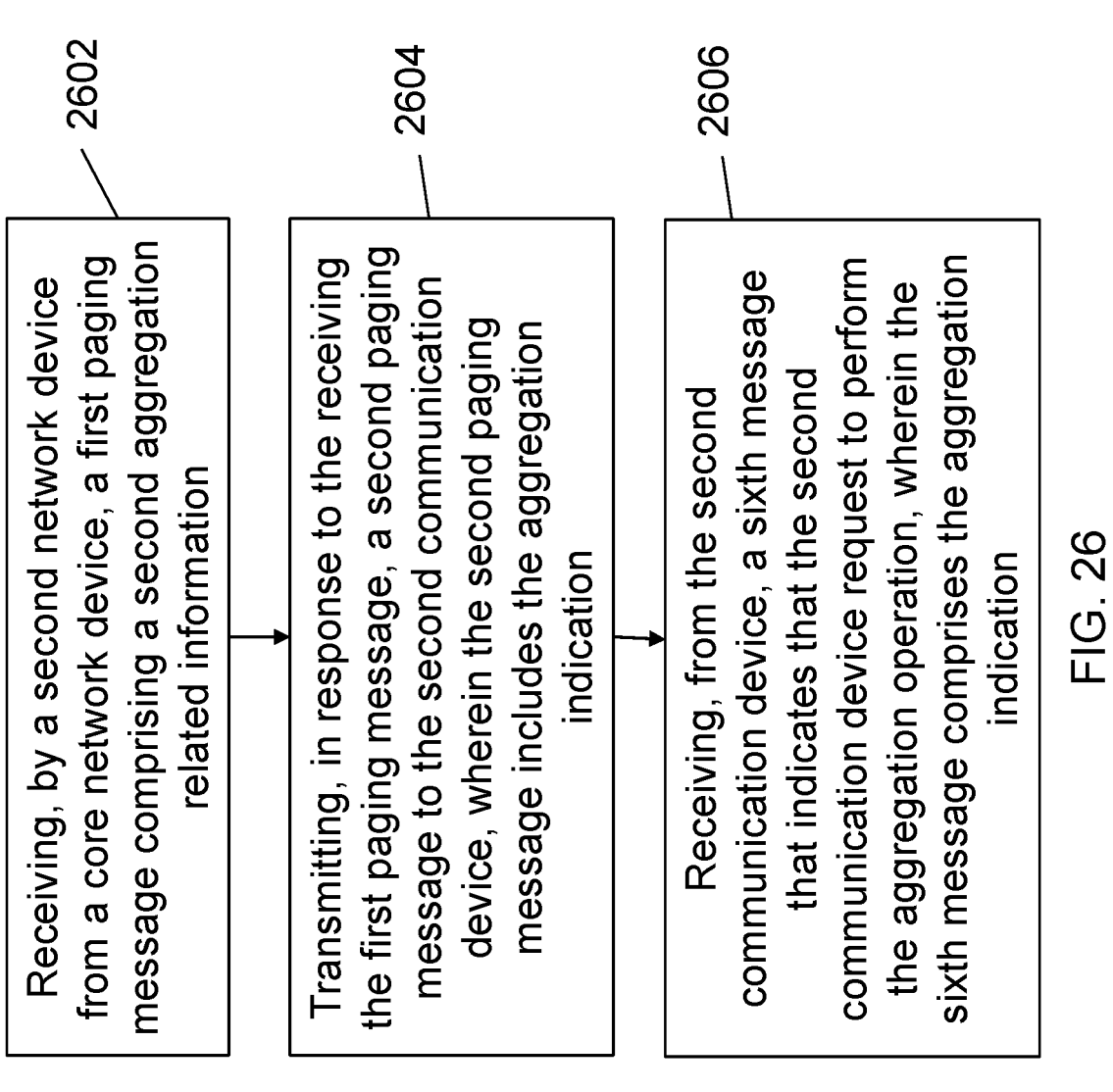

FIG. 26 shows an exemplary flowchart for facilitating an aggregation operation. Operation 2602 includes receiving, by a second network device from a core network device, a first paging message comprising a second aggregation related information that includes: an aggregation indication that indicates that the aggregation operation is enabled, a radio capability of the second communication device, a first identifier of the first communication device, or an identifier of the first network device. Operation 2604 includes transmitting, in response to the receiving the first paging message, a second paging message to the second communication device, wherein the second paging message includes the aggregation indication. Operation 2606 includes receiving, from the second communication device, a sixth message that indicates that the second communication device request to perform the aggregation operation, wherein the sixth message comprises the aggregation indication. In some embodiments, the core network device includes an access and mobility management function (AMF).

FIG. 27 shows an exemplary flowchart for facilitating an aggregation operation. Operation 2702 includes receiving, by a first network device from a second network device, a ninth message that requests an addition of the second network device for an aggregation operation. Operation 2704 includes transmitting, to the second network device in response to the receiving the ninth message, an eighth message that comprises an aggregation configuration information. Operation 2706 includes receiving, by the first network device from the second network device after the transmitting the eighth message, a seventh message comprising an aggregation related information. Operation 2708 includes transmitting, by the first network device to a first communication device and in response to the receiving the seventh message, a first message comprising a second configuration information of a second communication device.

In some embodiments, the aggregation related information includes any one or more of: a first list of one or more identifiers of one or more communication devices for performing the aggregation operation, wherein the one or more communication devices includes the second communication device, a second list of communication device identifiers that belong to a same user, a radio capability of the second communication device, or an identifier of the radio capability of the second communication device. In some embodiments, the aggregation configuration information in the eighth message includes any one or more of: one or more radio parameters of the second network device, a first configuration for a protocol data unit (PDU) session of a transmission or of a reception by the aggregation operation, a second configuration for a quality of service (QoS) flow of the transmission or of the reception by the aggregation operation, or a first configuration information of the first communication device for the aggregation operation.

In some embodiments, the second configuration information comprises any one or more of: a radio configuration information configured for the second communication device, or one or more address related parameters of the second communication device. In some embodiments, prior to the receiving the ninth message, the method further comprises: receiving a tenth message from a core network device, wherein the tenth message includes the aggregation related information. In some embodiments, the core network device includes an access and mobility management function (AMF).

In this document, the primary gNB and the secondary gNB can be the same gNB, e.g. the primary UE and the secondary UE locates in the same gNB. In which case, the messages or steps between the primary gNB and the second gNB are skipped and does not impact the implementation. In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

21

22

What is claimed is:

1. A wireless communication method, comprising:
transmitting, by a network device to a second communication device, a first message that triggers the second communication device to perform an aggregation operation,
wherein the second communication device is from a list of one or more communication devices received by the network device from a core network device for performing the aggregation operation or from a first communication device;
receiving, from the second communication device, a second message comprising a second configuration information of the second communication device; and
transmitting, to the first communication device and in response to the receiving the second message, a third message comprising second configuration information of the second communication device.

2. The method of claim 1, wherein the second configuration information in the third message comprises any one or more of:
one or more address related parameters of the second communication device, or
an aggregated data volume information of the second communication device.

3. The method of claim 1, wherein the third message further comprises a radio configuration information configured for the second communication device.

4. The method of claim 1, wherein the first message comprises a first configuration information of the first communication device for the aggregation operation.

5. The method of claim 1, wherein the core network device includes an access and mobility management function (AMF).

6. The method of claim 1, wherein the first message comprises a first configuration for a protocol data unit (PDU) session of a transmission or of a reception by the aggregation operation.

7. The method of claim 1, wherein the first message comprises a second configuration for a quality of service (QoS) flow of the transmission or of the reception by the aggregation operation.

8. The method of claim 1, further comprising:
transmitting or receiving, by the network device, data with the first communication device using the aggregation operation.

9. The method of claim 8, wherein the transmitting the data using the aggregation operation comprises:
transmitting a first packet data convergence protocol (PDCP) protocol data unit (PDU) set corresponding to the data to the second communication device and transmitting a second PDCP PDU set corresponding to the data to the first communication device.

10. The method of claim 8, wherein the receiving the data using the aggregation operation comprises:
receiving a first packet data convergence protocol (PDCP) protocol data unit (PDU) set corresponding to the data from the second communication device and receiving a second PDCP PDU set corresponding to the data from the first communication device.

11. The method of claim 8, wherein the transmitting the data using the aggregation operation comprises:
transmitting the data to the second communication device and the first communication device.

12. The method of claim 8, wherein the receiving the data using the aggregation operation comprises:
receiving the data from the second communication device and the first communication device.

13. An apparatus for wireless communication comprising at least one processor, configured to implement a method, the at least one processor configured to:
transmit, by a network device to a second communication device, a first message that triggers the second communication device to perform an aggregation operation,
wherein the second communication device is from a list of one or more communication devices received by the network device from a core network device for performing the aggregation operation or from a first communication device;
receive, from the second communication device, a second message comprising a second configuration information of the second communication device; and
transmit, to the first communication device and in response to the receiving the second message, a third message comprising second configuration information of the second communication device.

14. The apparatus of claim 13, wherein the second configuration information in the third message comprises any one or more of:
one or more address related parameters of the second communication device, or
an aggregated data volume information of the second communication device.

15. The apparatus of claim 13, wherein the third message further comprises a radio configuration information configured for the second communication device.

16. The apparatus of claim 13, wherein the first message comprises a first configuration information of the first communication device for the aggregation operation.

17. The apparatus of claim 13, wherein the core network device includes an access and mobility management function (AMF).

18. The apparatus of claim 13, wherein the first message comprises a first configuration for a protocol data unit (PDU) session of a transmission or of a reception by the aggregation operation.

19. The apparatus of claim 13, wherein the first message comprises a second configuration for a quality of service (QoS) flow of the transmission or of the reception by the aggregation operation.

20. The apparatus of claim 13, wherein the at least one processor is further configured to:
transmit or receive, by the network device, data with the first communication device using the aggregation operation.

* * * * *